United States Patent
Wilkes

(10) Patent No.: US 9,721,261 B2
(45) Date of Patent: *Aug. 1, 2017

(54) SYSTEMS AND METHODS FOR ELECTRONICALLY CIRCULATING A CONDITIONAL ELECTRONIC CURRENCY

(75) Inventor: Bradley Wilkes, Alpine, UT (US)

(73) Assignee: CapitalWill, LLC, Alpine, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,176

(22) Filed: Mar. 12, 2012

(65) Prior Publication Data

US 2012/0185395 A1     Jul. 19, 2012

Related U.S. Application Data

(63) Continuation-in-part of application No. 13/322,103, filed on Dec. 14, 2011, and a continuation-in-part of application No. 12/645,079, filed on Dec. 22, 2009, and a continuation-in-part of application No. 12/472,249, filed on May 26, 2009, now Pat. No. 8,306,910.

(51) Int. Cl.
  *G06Q 20/06*    (2012.01)
  *G06Q 30/02*    (2012.01)
  *G06Q 20/14*    (2012.01)
  *G06Q 20/40*    (2012.01)

(52) U.S. Cl.
  CPC .............. *G06Q 30/02* (2013.01); *G06Q 20/06* (2013.01); *G06Q 20/0655* (2013.01); *G06Q 20/14* (2013.01); *G06Q 20/40* (2013.01)

(58) Field of Classification Search
  CPC ................................................ G06Q 20/0655
  See application file for complete search history.

(56) References Cited

U.S. PATENT DOCUMENTS

| | | |
|---|---|---|
| 5,453,601 A | 9/1995 | Rosen |
| 5,581,064 A | 12/1996 | Riley et al. |
| 5,768,385 A | 6/1998 | Simon |
| 5,832,089 A | 11/1998 | Kravitz et al. |

(Continued)

FOREIGN PATENT DOCUMENTS

JP     2003-076851 A     3/2003

OTHER PUBLICATIONS

U.S. Patent Office, Office Action for U.S. Appl. No. 12/472,249, mailed Apr. 2, 2012.

(Continued)

*Primary Examiner* — Scott Zare
(74) *Attorney, Agent, or Firm* — Stoel Rives LLP

(57) ABSTRACT

Persistent, electronically anchored currency notes (PEAC notes) may be generated by a transaction provider and maintained in a datastore. Each PEAC note may be associated with a respective unique identifier and asset held by a custodian. The transaction provider may provide for assigning ownership of the PEAC notes to various entities and/or transferring ownership therebetween. Ownership transfers may be performed by the transaction provider while maintaining the PEAC notes in the datastore and/or maintaining the asset(s) associated therewith their respective custodian(s). A PEAC note may be tied to one or more usage conditions, which restrict transfers thereof. The usage conditions may be removed when release conditions are satisfied.

22 Claims, 15 Drawing Sheets

(56) References Cited

U.S. PATENT DOCUMENTS

| | | | |
|---|---|---|---|
| 5,937,394 | A | 8/1999 | Wong et al. |
| 5,983,207 | A | 11/1999 | Turk et al. |
| 6,122,625 | A | 9/2000 | Rosen |
| 6,205,437 | B1 | 3/2001 | Gifford |
| 7,003,479 | B2 | 2/2006 | Cowell et al. |
| 7,013,286 | B1 | 3/2006 | Aggarwal et al. |
| 7,269,256 | B2 | 9/2007 | Rosen |
| 7,578,439 | B2 | 8/2009 | Graves et al. |
| 7,590,602 | B1 | 9/2009 | Luzzatto |
| 7,739,168 | B2 | 6/2010 | Gillin et al. |
| 7,757,090 | B2 | 7/2010 | Silverbrook et al. |
| 7,814,009 | B1 | 10/2010 | Frenkel |
| 7,891,122 | B2 | 2/2011 | Lauer et al. |
| 2002/0013767 | A1 | 1/2002 | Katz |
| 2002/0022966 | A1 | 2/2002 | Horgan |
| 2003/0149662 | A1 | 8/2003 | Shore |
| 2003/0187798 | A1 | 10/2003 | McKinley et al. |
| 2004/0193487 | A1 | 9/2004 | Purcell et al. |
| 2006/0041478 | A1 | 2/2006 | Zheng |
| 2006/0116960 | A1 | 6/2006 | Gillin et al. |
| 2007/0150413 | A1 | 6/2007 | Morgenstern |
| 2007/0179883 | A1* | 8/2007 | Questembert .................. 705/39 |
| 2007/0244812 | A1 | 10/2007 | Turk et al. |
| 2007/0255653 | A1 | 11/2007 | Tumminaro et al. |
| 2007/0276727 | A1 | 11/2007 | Thibedeau |
| 2008/0040274 | A1 | 2/2008 | Uzo |
| 2008/0195499 | A1 | 8/2008 | Meredith et al. |
| 2008/0262928 | A1 | 10/2008 | Michaelis |
| 2008/0262969 | A1 | 10/2008 | Samid |
| 2009/0076912 | A1 | 3/2009 | Rajan et al. |
| 2009/0094134 | A1 | 4/2009 | Toomer et al. |
| 2009/0119190 | A1 | 5/2009 | Realini |
| 2009/0119209 | A1 | 5/2009 | Sorensen et al. |
| 2009/0299848 | A1 | 12/2009 | Cao et al. |
| 2009/0319433 | A1 | 12/2009 | Luzzatto |
| 2010/0088231 | A1 | 4/2010 | Eugenio |
| 2010/0275267 | A1 | 10/2010 | Walker et al. |
| 2011/0079644 | A1 | 4/2011 | Wolfe et al. |
| 2011/0103653 | A1 | 5/2011 | Keswani et al. |

OTHER PUBLICATIONS

"CashEdge Unveils a P2P Service to be Controlled by Banks," http://www.javelinstrategy.com/2009/06/24/cashedge-unveils-a-p2p-serv . . . , Jun. 24, 2009, printed Jul. 15, 2009, 1 pg.
"Anti-anti money laundering," http://digitaldebateblogs.typepad,com/digital_money/2009/06/anti-anti-m . . . , Jun. 7, 2009, printed Jul. 15, 2009, 3 pgs.
"Pay With Facebook? No Thanks!" http://www.worldboxx.com/pay-with-facebook-no-thanks/ , printed Jul. 15, 2009, 2 pgs.
Kincaid, Jason, "Facebook Revs Up for Payment Platform with Updated Terms," http://www.techcrunch.com/2009/05/29/facebook-revs-up-for-payment-pl . . . , May 29, 2009, printed Jul. 15, 2009, 3 pgs.
"Should the Fed be the 14$^{th}$ Payment Network, and How Would That Solve the Problems?" http://thebankwatch.com/2009/05/26/should-the-fed-be-the-14th-payment . . . , printed Jul. 15, 2009, 2 pgs.
"New to Virtual Currency? Where to begin (Part 2)," http://blog.twofish.com/2009/04/new-to-virtual-currency-where-to-begin-, printed Jul. 15, 2009, 2 pgs.
Rutherford, Lisa, "The Universal Currency Wars Are Coming," http://venturebeat.com/2009/05/29/the-universal-currency-wars-are-coming/, May 29, 2009, printed Jul. 15, 2009, 3 pgs.
Cardinale, Matthew, "Local Currencies Really Can Buy Happiness," May 30, Atlanta, Georgia, http://ipsnorthamerica.net/print.php?idnews=2280, printed Jul. 15, 2009, 2 pgs.
Wolfers, Justin, "Forecast: There Will Be No More Cash in 2012," http://freakonomics.blogs.nytimes.com/2009/05/19/forecast-there-will-be . . . , May 19, 2009, printed Jul. 15, 2009, 1 pg.
Van Dyke, James, "American President Says, 'Tear Down That Wall!' (wait, it's Obama instead of Reagan, and he's using money transfers!)," http://www.javelinstrategy.com/2009/04/13/american-president-says-tear . . . , Apr. 13, 2009, printed Jul. 15, 2009, 1 pg.
International Search Report with Written Opinion for PCT/US2010/036252 filed May 26, 2010, and mailed Jan. 3, 2011, 9 pgs.
Office Action for U.S. Appl. No. 12/472,249, filed May 26, 2009, mailed Oct. 11, 2011, 16 pgs.
Office Action for U.S. Appl. No. 12/645,079, filed Dec. 22, 2009, mailed Oct. 26, 2011, 17 pgs.
IPRP for PCT/US2010/036252, filed May 26, 2010, and mailed Dec. 8, 2011, 6 pgs.
Wilkes, Final Office Action dated Jan. 8, 2014 for U.S. Appl. No. 13/322,103.
Wilkes, Non-Final Office Action dated Jun. 9, 2015 for U.S. Appl. No. 13/322,103.
Wilkes, "Systems and Methods for Electroncally Circulating a Currency", Final Office Action dated Jan. 22, 2016 for U.S. Appl. No. 13/322,103.
Wilkes, "Systems and Methods for Electronically Circulating a Currency", Non-Final Office Action dated Jan. 13, 2017 for U.S. Appl. No. 13/322,103.
U.S. Patent Office, Office Action for U.S. Appl. No. 12/645,079, mailed Jun. 6, 2012.
U.S. Patent Office, Office Action for U.S. Appl. No. 12/645,079, mailed Feb. 20, 2013.
U.S. Patent Office, Office Action for U.S. Appl. No. 13/322,103, mailed Feb. 26, 2013.
Carlo Blundo et al., "A Lightweight Protocol for the Generation and Distribution of Secure E-coupons," WWW2002, May 7-11, 2002, Honolulu, HI, USA, ACM 1-58113-449-5/02/0005.
Office, Office Action for U.S. Appl. No. 13/418,176, mailed Feb. 13, 2013.
Office, Office Action for U.S. Appl. No. 13/841,683, mailed Jun. 28, 2013.
27. Jung, Wook, Andrew Kirby, Rajesh, Kolluri, Kenneth, Shannon,Yeo-won Yoon, "A Comparison of Electronic Cash Schemes and Their Implementations", ECE 646 AS-3 Group Project, George Mason University, 1999.

* cited by examiner

200 ⤵

| 210 | Unique Currency Note Identifier (UCNID) |
| 212 | Owner Identifier (UEID) |
| 220 | Currency Type |
| 222 | Denomination |
| 230 | Currency Reserve Identifier (UCRID) |
| 236 | Promotional Information |
|     | ... |

| 240 | Unique Currency Note Identifier (UCNID) |
| 212 | Owner Identifier (UEID) |
| 242 | Currency Type |
| 244 | Denomination |
| 246 | Account Identifier (AID) |
| 248 | Account Custodian Identifier (ACID) |
| 236 | Promotional Information |
|     | ... |

| 250 | Invoice Identifier (UIID) |
| 251 | Invoice Payment |
| 252 | Invoice Amount |
| 254 | Invoice Details |
| 256 | Invoice Payee (UEID) |
| 258 | Invoice Payer (UEID) |
|     | ... |

Figure 2C

SYSTEMS AND METHODS FOR ELECTRONICALLY CIRCULATING A CONDITIONAL ELECTRONIC CURRENCY

CROSS-REFERENCE TO RELATED APPLICATIONS

This application is a continuation in part of U.S. patent application Ser. No. 13/322,103, entitled "Systems and Methods for Electronically Circulating a Currency," filed on Nov. 22, 2011, and claims priority to U.S. patent application Ser. No. 12/645,079, entitled "Systems and Methods for Electronically Circulating a Currency," filed on Dec. 22, 2009 and U.S. patent application Ser. No. 12/472,249, entitled "Systems and Methods for Electronically Circulating a Currency," filed on May 26, 2009, each of which is hereby incorporated by reference in its entirety.

TECHNICAL FIELD

This disclosure relates to payment transaction systems and, in particular, to systems and methods for electronically circulating a currency as persistent, electronically anchored currency notes (PEAC notes).

BRIEF DESCRIPTION OF THE DRAWINGS

FIG. 2A depicts one embodiment of a persistent, electronically anchored currency note associated with a physical currency note maintained in a currency reserve;

FIG. 2B depicts one embodiment of a persistent, electronically anchored currency note associated with an asset maintained by a custodian;

FIG. 2C depicts one embodiment of an invoice data structure;

DETAILED DESCRIPTION

Figure 1:
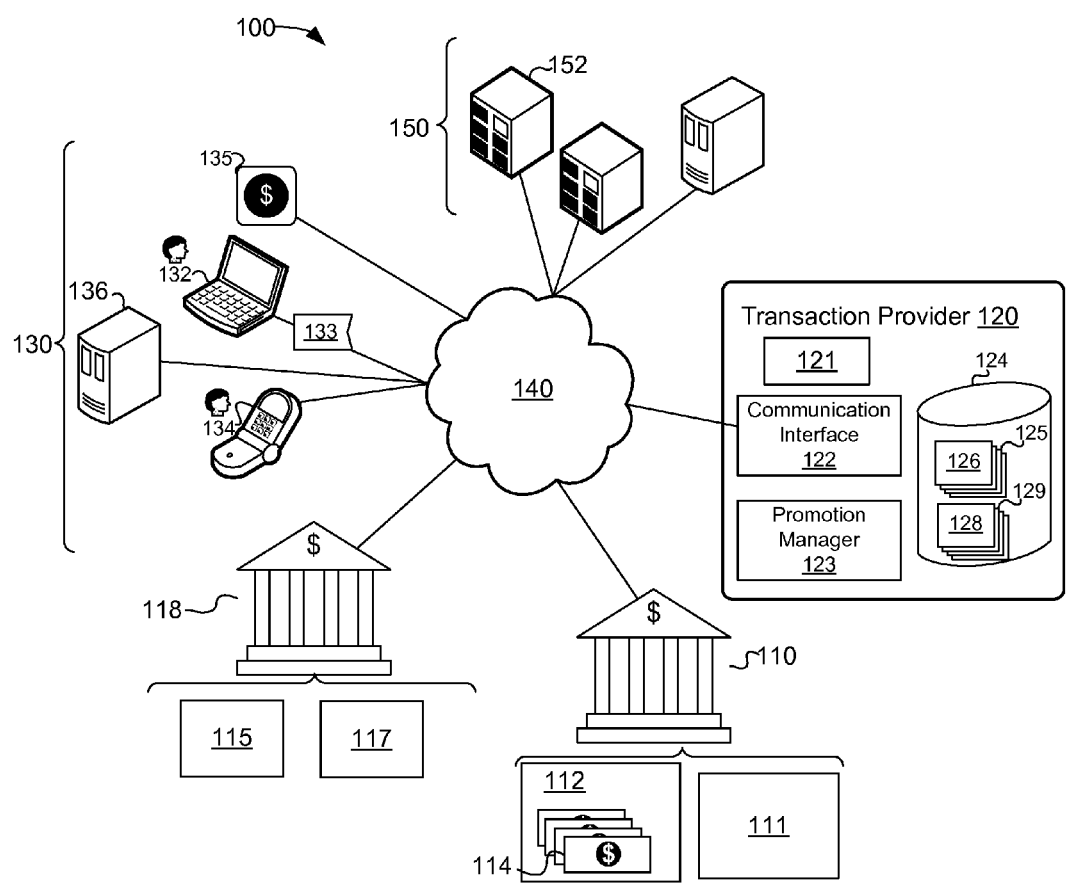
FIG. 1 is a block diagram of one embodiment of a system for electronically circulating a currency.

Various payment systems are available through which a payee may accept payment from a payer. Many of these payment systems impose transaction costs. For example, a credit card transaction may include fixed and percentage-based transaction costs payable to the credit card issuer and/or a credit card authorization service.

In addition, many conventional payment systems require that the payer and/or payee be registered with a payment service (transaction provider). For example, in order to pay via credit card, the payee must apply, and be approved for, a credit account with a credit card issuer. Similarly, the payee may be required to have a merchant account with the card issuer (or have some other arrangement for accepting credit card payments). Some potential payees may not wish to register with a credit card issuer and/or may not qualify for a credit line with the card issuer.

Furthermore, the transaction may require that the payer and payee provide personal information to the transaction provider. For example, the payer may be required to provide personal information in order to apply for an account with a transaction provider (e.g., credit card issuer), and the payee may be required to register a merchant account to receive payments through the transaction provider. Other transaction systems (e.g., bank transfers, many on-line transaction systems, and the like) may require that personal information be disclosed.

This private, personally-identifying information may be maintained in confidence by the transaction provider (e.g., credit card issuer). However, information leakage may occur. For example, merchants and transaction providers have experienced data breaches wherein customers' personal information has been exposed.

Moreover, the transaction between the payer and payee may require the payer to expose personal information. For example, in a credit card transaction, the payer may be required to provide a credit card number, verification number, and/or a signature. This information could be used at a later time to make fraudulent transactions using the payer's card.

The systems and methods disclosed herein may provide for electronically circulating a currency to thereby provide low-cost transactions, which may minimize the need for personal information to be exchanged between transacting entities. In addition, the transactions disclosed herein may be performed using little or no personally-identifying information.

In some embodiments, a transaction provider may maintain a set of persistent, electronically anchored currency notes ("PEAC notes"). As used herein, a PEAC note may refer to a persistent, electronic record of an asset (e.g., anchored to an asset). A PEAC note may represent a physical currency note, such as a United States dollar. For example, a PEAC note may be uniquely associated with a particular, physical currency note (e.g., a US dollar) held by a holder (e.g., currency reserve, deposit institution, or the like). Accordingly, a PEAC note may be an "electronic representation" of a particular, physical currency note and, as such, may derive its properties and/or value from the associated physical currency note; a PEAC note associated with a U.S. twenty dollar bill may represent a value of twenty U.S. dollars.

In other examples, a PEAC note may be associated with an asset, such as a custodial account, brokerage account, deposit account, money market account, stock account, or the like. A collection of PEAC notes may be associated with the asset, each PEAC note representing a respective value. As will be discussed below, the sum value of the PEAC notes associated with a particular asset may be determined by the value of the particular asset (e.g., the "circulating value" of the associated PEAC notes may be less than or equal to the value or the asset, or may exceed the value of the asset).

A PEAC note may be represented in a datastructure maintained by a transaction provider. Each PEAC note datastructure may be assigned a unique identifier (a Unique Currency Note Identifier ("UCNID")). The UCNID of a PEAC note associated with a particular, physical currency note may be derived from the properties of the note, such as serial number, etc. The UCNID of a PEAC note associated with other types of assets (e.g., custodial account) may be generated using random data and/or data configured to prevent identifier collisions. In some embodiments, UCNIDs may comprise security features, such as digital signatures or the like, to prevent UCNID spoofing. In addition, in some embodiments, a UCNID may comprise a Uniform Resource Indictor (URI) (or Uniform Resource Locator (URL)), which may allow the PEAC note to be referenced on a network, such as the Internet.

A PEAC note datastructure (or generally "PEAC note") may identify the asset associated therewith. Accordingly, the UCNID of a PEAC note may uniquely identify a particular, physical currency note (by denomination, serial number, and the like), identify a particular asset (e.g., identify custodial account at a particular institution), or the like. In addition, the PEAC datastructure may identify the holder or custodian of the associated asset. For example, the datastructure of a PEAC note associated with a particular, physical currency note may identify the currency reserve where the note is being held (e.g., by name, address, contact information, or the like). The datastructure of a PEAC note associated with an asset may identify the asset custodian and/or institution holding the asset.

A PEAC note may include an "owner identifier," which may determine who currently owns the PEAC note. Ownership of a PEAC note may comprise ownership of the asset represented thereby. For example, ownership of a PEAC note associated with a particular, physical currency note (a twenty dollar bill) may represent ownership of the bill (or the equivalent thereof). Ownership of a PEAC note associated with an asset having a quantifiable value may represent ownership of a portion of the asset (as determined by the asset value and value of the PEAC note). For example, ownership of a "twenty-dollar" PEAC note associated with a custodial account may represent ownership of "twenty dollars worth" of the custodial account value (e.g., twenty dollars in the custodial account).

The transaction provider may be configured to audit the custodians associated with the PEAC notes. Auditing may comprise validating that a custodian holds the physical currency note(s) associated with one or more PEAC notes. Alternatively, or in addition, auditing may comprise verifying that the asset (e.g., custodial account) associated with one or more PEAC notes has sufficient value to cover the "circulating value" (discussed below) of the PEAC notes. An audit may further comprise verifying asset insurance, or other asset properties.

The owner of a PEAC note may be identified by a Unique Entity Identifier or "UEID," which may comprise a distinguished name, an alias, an email address, or any other identifying information. The owner of a PEAC note may transfer ownership to another entity. Transferring ownership may comprise updating the owner identifier of the PEAC datastructure with the UEID of the new owner. The transfer may take place without affecting the asset associated with the PEAC note (e.g., without transferring the associated physical currency note and/or changing the value of the associated asset). Accordingly, PEAC note ownership transfers may have little or no transaction costs. Similarly, the transfer may take place while maintaining the PEAC note at the transaction provider (e.g., without transferring the PEAC datastructure to either entity), which may provide for high-security transactions.

The transaction provider may maintain an ownership history of the PEAC notes circulated thereby. The ownership history may be maintained within the PEAC note itself (e.g., in an ownership history field of the PEAC note datastructure and/or using a "multi-valued" owner identifier field). The ownership history may comprise a listing of each entity who has owned the PEAC note (e.g., by UEID).

In some embodiments, the transaction provider may provide public access to information about the PEAC notes circulated thereby. Access may be provided via a network, such as the Internet. The transaction provider may provide an interface (web page(s)) to display information about a PEAC note, which may include the current owner of a PEAC note, PEAC note ownership history, the asset associated with the PEAC note, and so on. In some embodiments, the UCNID of a PEAC note may be embodied as a URI, which may be used to access the corresponding PEAC note "page" provided by the transaction provider. Alternatively, a URL to the PEAC note "page" may be derived from the UNCID of the PEAC note (e.g., the UCNID plus a static URL portion).

FIG. 1 is a block diagram of one embodiment of a system 100 for electronically circulating a currency. The system 100 includes an institution 110, which may be a depository institution, such as a bank, a savings bank, a credit union, a financial institution, or any other institution capable of holding currency or other assets (e.g., a "holder" or "custodian" of a physical currency reserve 112 or other asset, such as a custodial account 111 or the like).

In some embodiments, the institution 110 may hold a currency reserve 112 comprising a set of physical currency notes that are dedicated for use in the system 100. The currency reserve 112 may include currency notes of any type and/or in any denomination. For example, the currency reserve 112 may include a plurality of United States dollars, Euros, Canadian dollars, and so on in various denominations. The currency notes held in the currency reserve 112 may have certain attributes from which a unique identifier may be derived (e.g., UCNID). For example, United States dollars may include a serial number, a series date, and other attributes. These attributes may be used to generate a UCNID for the corresponding PEAC note, which may uniquely identify the PEAC note datastructure (and allow the PEAC note to uniquely identify the physical currency note associated therewith).

In some embodiments, the institution 110 may be the custodian of an asset, such as a custodial account 111. The asset (e.g., custodial account 111) may have a quantifiable value (e.g., an account balance). A plurality of "virtual" currency notes may be derived from the account 111, each being assigned a respective value (denomination) and UCNID. The sum value of the "virtual" currency notes that may be derived from the account 111 may be based on the value (or insured value) of the account 111, as disclosed below.

The system 100 may comprise a transaction provider 120. The transaction provider 120 may comprise one or more computing devices (e.g., server computers), each of which may comprise one or more processors 121, memory units (not shown), a datastore 124 (comprising computer-readable storage media), human-machine interface (HMI) components (e.g., input/output devices, displays, etc., (not shown)), communication interfaces 122, and the like. As will be discussed below, the transaction provider 120 may be configured to provide various interfaces for managing PEAC notes, transferring PEAC notes and the like. In some embodiments, the interfaces may be provided as browser-renderable markup, such as Hyper Text Markup Language (HTML). Accordingly, the transaction provider 120 may comprise a web-server (not shown) or the like.

The transaction provider 120 may be implemented using one or more computer-readable instructions stored on a computer-readable storage medium (e.g., the datastore 124). Therefore, portions of the transaction provider 120 may be embodied as discrete software modules on the datastore 124. Other portions and/or components of the transaction provider 120 may be implemented using one or more hardware components and/or may be tied to particular hardware components. For example, the data structure 126 (discussed below) may be tied to the computer-readable storage medium and/or the communication interface 122 may be tied to particular communications devices (e.g., network interface cards, wireless transmitters, etc.). Therefore, portions of the transaction provider 120 may be tied to a particular machine.

The transaction provider 120 may be communicatively coupled to the institution 110 (and institution 118). The communication therebetween may be continuous and/or periodic. In some embodiments, the transaction provider 120 may receive from the institution 110 a listing of physical currency notes in the currency reserve 112. The listing may include attributes of the notes 112, such as the denomination, serial number, and the like. Using this information, the transaction provider 120 may generate a plurality of corresponding PEAC notes (datastructures 126) in the datastore 124. Ownership of the PEAC notes 126 may be assigned to and/or transferred between entities 130 via the network 140.

In some embodiments, the transaction provider 120 may receive information from the institution 110 regarding the custodial account 111. The information may comprise a value of the custodial account 111, an insured value of the custodial account 111, a risk level, and so on. Using this information, the transaction provider may generate a plurality of "virtual" currency notes, each having a respective denomination (value), and UCNID. Representations of the "virtual" currency notes may be stored as PEAC note datastructures 126 in the datastore 124. Alternatively, or in addition, the transaction provider 120 may provide a separate storage location (not shown) for the PEAC note datastructures associated non-currency assets.

The PEAC note datastructures 126 generated and/or maintained by the transaction provider 120 may be implemented using any data storage technique known in the art including, but not limited to: a file system, structured data (e.g., XML, as delimiter-separated values, etc.), a relational data store (e.g., a database), a directory (e.g., a Lightweight Directory Access Protocol (LDAP) directory, an X.509 directory, or the like), or the like.

In some embodiments, the transaction provider 120 may be in communication with the institution 110 (and/or the institution 118 discussed below) to perform periodic audits. The audits may be performed against the currency reserve 112 and/or custodial account 111 (or any other asset against which PEAC notes have been generated). An audit of a currency reserve 112 may comprise the transaction provider 120 verifying that the currency reserve 112 possesses the physical currency notes corresponding to the PEAC note datastructures maintained thereby. For example, the transaction provider 120 may maintain a PEAC datastructure corresponding to a particular, physical currency note 114. The transaction provider 120 may query the institution 110 (and/or currency reserve 112 thereof) to verify that the note 114 is actually present within the currency reserve 112. The association between the PEAC note datastructure and the particular, physical currency note 114 may be determined and/or maintained based on the UCNID of the PEAC note which, as discussed above, may be derived from the serial number of a physical currency note (e.g., note 114).

A similar audit procedure may take place for PEAC notes associated with an asset, such as the custodial account 111. The transaction provider 120 may determine a value of the PEAC notes associated with the account 111 (e.g., by identifying the PEAC notes 126 that are associated with the account 111). The transaction provider 120 may then query the institution 110 (and/or custodian of the account 111) to determine the current value of the account 111. The transaction provider 120 may compare the value of the account to the sum value of the PEAC notes to determine whether the account 111 is sufficiently funded.

In some embodiments, a sum of the values of the PEAC notes associated with an asset (e.g., the account 111) may be maintained so as to be less than or equal to the value thereof:

$$V_a \geq \Sigma_{i=1}^{t} n_i \qquad \text{Eq. 1}$$

In Equation 1, $V_a$ represents the value of the asset (e.g., value of custodial account 111), which is to be maintained greater than or equal to a sum of the value of the PEAC notes associated therewith (in Equation 1, t represents the number of PEAC notes associated with the asset, and $n_i$ is the denomination (value) of a particular one of the PEAC notes).

In some embodiments, the transaction provider 120 may allow only a certain portion of the value of an asset to the circulated. For example, an account 111 that is considered to be volatile (e.g., invested in the stock market), may be used to "back" PEAC notes totaling only ½ the value of the account 111. Alternatively, another account 111 maintained by a well-known and diversified institution 110 may be allowed to circulate more than the value of the account 111 (e.g., may be leveraged). A leveraged (or reduced circulation) account 111 may be expressed as follows:

$$r^* V_a \geq \Sigma_{i=1}^{t} n_i \qquad \text{Eq. 2}$$

In Equation 2, r represents a leverage ratio of an account. If r is less than one, the account may be allowed to circulate less than its value (e.g., the account may be highly volatile); if r is greater than one, the account may be leveraged (e.g., allowed to circulate more than its value).

The custodian of an asset may receive and/or transfer PEAC notes within the system 100. Therefore, the custodian may have ownership of one or more of the PEAC notes associated with the asset. In some embodiments, the value of the PEAC notes owned by the custodian itself may not be counted against the "circulating value" of the asset, since these PEAC notes do not necessarily represent a liability of the asset. The circulating value of an asset may, therefore, be calculated as follows:

$$CV_a = \sum_{i=1}^{t_e} n_i - \sum_{x=1}^{t_c} n_x \qquad \text{Eq. 3}$$

In Equation 3, $CV_a$ represents the circulating value of the asset, $t_e$ represents the total number of PEAC notes associated with the asset, $n_i$ is the denomination (value) of a particular, PEAC note, $t_c$ represents the number of PEAC notes associated with the asset that are owned by the asset custodian, and $n_x$ is the denomination (value) of a particular PEAC note owned by the custodian. As illustrated in Equation 3, the circulating value CVa is a difference between the sum of all of the PEAC notes associated with an asset and a sum of the PEAC notes owned by the asset custodian.

Combining Equations 2 and 3, the amount of virtual currency that may be associated with an asset may be expressed as:

$$r^* V_a \geq \sum_{i=1}^{t_e} n_i - \sum_{x=1}^{t_c} n_x \qquad \text{Eq. 4}$$

As illustrated in Equation 4, the circulating value of the PEAC notes of an asset (the sum of the PEAC notes associated with the asset minus a sum of the PEAC notes owned by the asset custodian), may be maintained to be less than or equal to the value of the asset ($V_a$) as scaled by a leverage factor r. The transaction provider 120 may be configured to enforce the relationship of Equation 4, which may comprise the transaction provider 120 preventing the custodian (institution 110) from withdrawing funds from an asset (e.g., account 111), preventing devaluation of the asset, preventing underinsurance of the asset, preventing electronic circulation of additional PEAC notes associated with the asset (e.g., prevent the custodian from issuing new PEAC notes), and so on.

Although FIG. 1 is described in connection with a custodial account 111 in an institution 110, the disclosure is not limited in this regard. As discussed above, other types of assets may be used to back PEAC notes under the teachings of this disclosure. The assets used to back PEAC notes may have a quantifiable value, which may determine the total amount of PEAC notes that may be associated therewith (e.g., using Equations 1-4 as described above).

The transaction provider 120 may assign ownership to the PEAC notes maintained thereby to various entities 130. The transaction provider may be communicatively coupled the entities 130 via the communication network 140, which may comprise any communication network and/or infrastructure known in the art (e.g., a TCP/IP network, the Internet, a virtual private network (VPN), a wide area network (WAN), a public switched telephone network (PSTN), a combination of networks, or the like).

The entities 130 may interact with the transaction provider 120 using respective computing devices, which may include, but are not limited to: personal computers, laptops, hand held computing devices, cellular phones, tablet computers, etc. As used herein, an entity 130 may refer to any entity capable of entering into monetary transactions including, but not limited to: an individual person, an organization, a business organization (e.g., a corporation, a limited liability company (LLC), a partnership, or any other business organization), a storefront, a group, a non-profit organization, or the like Each entity 130 may be identified using a respective identifier or UEID. As discussed above, a UEID may include, but is not limited to: an email address, a DN, a URI, a uniform name identifier (URN), an OpenID® identifier (registered trademark of the OpenID Foundation Corp., Portland, Oreg.), or any other identifier capable of uniquely identifying an entity 130 (e.g., a legal name, a corporate name, a doing business as (DBA) name, or the like).

In some embodiments, one or more of the entities 130 may be associated with a third-party service 150, which may be configured to authenticate the identity of the entities 130 to the transaction provider and/or authenticate messages transmitted thereby. The third-party service 150 may include, but is not limited to: a certificate authority (e.g., an X.509 certificate authority), an authentication authority and/or identity provider (e.g., a Security Assertion Markup Language (SAML) authentication authority, a Liberty Alliance Authenticating Authority, an OpenID® provider, etc.), or any other service 150 capable of authenticating the identity of an entity 130 and/or validating the authenticity of data transmitted thereby. In some embodiments, the transaction provider 120 may be configured to provide authentication and/or authorization services (e.g., the transaction provider 120 may act as an authentication/authorization authority).

The transaction provider 120 may be configured to assign ownership of the PEAC notes maintained thereby to the various entities 130. As discussed above, assigning ownership of a PEAC note to an entity 130 may comprise updating an owner identifier in the PEAC note datastructure. Ownership of a PEAC note may be assigned and/or transferred while maintaining the associated asset (e.g., physical currency note and/or custodial asset) with the institution 110.

An entity 130 may become the owner of a PEAC note in various ways, including, but not limited to: purchasing one or more PEAC notes from the institution 110 and/or the transaction provider 120, transferring one or more currency notes into a currency repository 112, receiving ownership of one or more currency notes from another entity 130 (e.g., via a transfer), or the like. In some embodiments, the transaction provider 120 may provide for adding currency notes to the currency reserve 112 (e.g., at the institution 110), withdrawing currency notes therefrom (as in a standard banking withdraw) and/or exchanging currency notes from a currency reserve 112, and so on. Such deposits and withdraws may be verified by the transaction provider 120, and corresponding PEAC notes 126 may be added and/or removed from circulation accordingly.

In some embodiments, an entity 132 may purchase one or more PEAC notes from a currency repository 110. The purchase may comprise the entity 132 providing a payment and/or depositing currency with the institution 110. The institution 110 may then cause the transaction provider 120 to generate corresponding PEAC notes for the entity 132 and/or may direct the transaction provider to transfer ownership of one or more existing PEAC notes (owed by the institution 110) to the entity 132. Alternatively, or in addition, PEAC notes may be purchased directly through the transaction provider 120. For example, an entity 132 may issue a request to the transaction provider 120 to purchase one or more PEAC notes (purchase "20 dollars" worth of PEAC notes). The transaction provider 120 may arrange a transfer of funds between the entity 132 and the institution 110 (e.g., via a currency exchange, check, wire transfer, credit card transaction, or the like) and/or may transfer PEAC notes owned by the transaction provider 120 to the entity 132. Although the disclosure provides several examples of mechanisms by which PEAC notes may be placed into and/or taken out of electronic circulation and/or purchased by an entity 130, the disclosure is not limited in this regard and could be adapted to use any asset transfer mechanism known in the art. As described above, however, the purchase of a PEAC note by an entity (including transferring ownership of the PEAC note thereto) may occur while maintaining the asset associated with the PEAC note (e.g., the physical currency note or asset) in the institution 111.

In some embodiments, the system 100 may include a point-of-sale or kiosk device 135. The device 135 may be used to deposit and/or withdraw currency from electronic circulation. For example, an entity (e.g., the first entity 132) may input physical currency notes into the device 135 and/or may transfer value to the device 135 in other ways (e.g., swipe a debit or credit card, perform an account transfer, or the like). An equivalent value in PEAC notes (perhaps less a transaction fee imposed by a provider or operator of the device 135) may be provisioned to the entity 132. For example, the device 135 may transfer the funds provided by the entity 132 to the institution 110, which may generate new PEAC notes for the entity 132 (e.g. deposit additional currency note(s) in the currency reserve 112 and/or transfer value into the custodial account 111). Alternatively, or in addition, the institution 110 may assign ownership of one or more PEAC notes already owned thereby to the entity 132.

Similarly, the first entity 132 may request disbursement of one or more of its PEAC notes at the kiosk or point-of-sale device 135. For example, the first entity 132 may transmit a request through the kiosk or point-of-sale device 135 to redeem or transfer PEAC notes owned by the first entity 132. Upon authorizing the request (which may include the UEID and/or authorization credential of the first entity 132 as discussed below), the transaction provider 120 may transfer ownership of the identified PEAC notes to an institution (e.g., institution 110) and/or to the transaction provider 120, and an equivalent amount of physical currency may be provided to the first entity 132 (e.g., dispensed from the device 135, provided as a redeemable receipt, or the like). Alternatively, the device 135 may act as a point-of-sale device, and the transfer may comprise transferring ownership of the identified PEAC notes to a storefront associated with the device 135 to pay for a product or service.

The transaction provider 120 may allow an owner of a PEAC note to transfer ownership thereof to another entity 130. In some embodiments, the transaction provider 120 may be configured to receive a transfer request 133 from an entity (e.g., entity 132). The transfer request 133 may specify one or more PEAC notes to transfer to another entity (e.g., entity 134). The transaction provider 120 may authorize the request 133 and, if the request is authorized (as described below), may transfer ownership of the PEAC notes to the specified entity. Transferring ownership may comprise the transaction provider 120 setting the specified entity 134 as the owner of the specified PEAC notes.

As an illustrative example, the transaction provider 120 may receive a transfer request 133 from the first entity 132 to transfer a particular PEAC note 125 to a second entity 134 (e.g., make a payment to the second entity 134). The transfer request 133 may be received over a network (e.g., by the communication interface 122 of the transaction provider 120). The transfer request 133 may include, but is not limited to: an identifier of a PEAC note 125 to transfer (e.g., include the UCNID of the PEAC note 125), the UEID of the first entity 132, an identifier of the second entity 134, and so on.

The transaction provider 120 may authorize the transfer request 133 and, if the transfer request 133 is authorized, may transfer ownership of the PEAC note 125 to the second entity 134. Authorizing the request may comprise verifying that the first entity 132 is the owner of the PEAC note 125.

The transaction provider 120 may query datastore 124 to determine ownership of the PEAC note 125. In some embodiments, ownership may be determined by comparing an "owner identifier" field of the PEAC note datastructure 125 to the UEID of the first entity 132 (e.g., the owner identifier field 212 of FIGS. 2A and 2B discussed below). If the identifiers match, the transaction provider 120 may verify that the first entity 132 is the owner, and the requested transfer may proceed; otherwise, the transaction provider 120 may determine that the first entity 132 is not the owner, and the request may be rejected.

In some embodiments, authorizing a transfer request may further comprise authenticating the transfer request 133 and/or validating that the transfer request 133 was authorized by the transferor (the first entity 132). The transaction provider 120 may use one or more third-party authentication/authorization services 150 to authenticate the identity of the entity 132 and/or to verify communications received therefrom (e.g., verify the transfer requests 133). For instance, the first entity 132 may be associated with a particular third-party authentication/authorization service 152, such as an OpenID® provider, and the transaction provider 120 may be configured to receive information authenticating the identity of the first entity 132 from the third-party service 152. The first entity 132 may provide an authentication credential to the service 152, which may authenticate the identity of the first entity 132 to the transaction provider 120 (e.g., via an application programming interface (API), such as the OpenID API, SAML API, Simple Object Access Protocol (SOAP), WS-Security API, or the like). In this way, the transaction provider 120 may authenticate the identity of the first entity 132 without receiving private or information therefrom.

Alternatively, or in addition to authenticating the identity of the entity 132, the transaction provider 120 may be configured to verify the authenticity and/or integrity of the communications purportedly received therefrom (e.g., the transfer request 133). In some embodiments, the transaction provider 120 may be configured to communicate with the entities 130 (including entity 132) over a secure connection, such as Secure Socket Layer (SSL) connection, or the like. The communications layer may provide verification of the integrity of messages transmitted thereon (e.g., verify that the request 133 was not tampered with and/or modified in transit). In addition, the communications layer may provide authentication services (e.g., mutually authenticated SSL). The communications themselves (e.g., the transfer request 133) may include authentication/verification information, such as an HTTP AUTH header, a token, a digital signature, or the like. For example, the transfer request 133 may include a digital signature referencing a digital certificate issued to the first entity 132. The transaction provider 120 may access a third-party server 150 (e.g., certification authority) to verify the authenticity of the signature/certificate. This operation may validate the integrity of the transaction request 133 and verify that it was transmitted by and/or authorized by the first entity 132.

Alternatively, or in addition, the transaction provider 120 may be configured to authenticate one or more of the entities 130 directly. The transaction provider 120 may provide for registration of one or more entities 130. Registration may comprise associating an identifier of the entity 130 (the UEID of the entity 130) with an authentication credential, such as a login name and/or password. An entity 130 may provide the credential to the transaction provider 120, which may use the credential to verify the identity of the entity 130. Although particular authentication and/or message verification techniques are discussed herein, the transaction provider 120 could be configured to implement and/or leverage any authentication and/or verification technique available in the art. Therefore, this disclosure should not be read as limited in this regard.

After authorizing the request, the transaction provider 120 may transfer ownership of the PEAC note 125 from the first entity 132 to the second entity 134. As discussed above, transferring ownership may comprise associating the PEAC note 125 with the second entity 134 in the datastore 124, which may comprise setting an "owner identifier" field of the PEAC note datastructure 125 to the UEID of the second entity 134. In some embodiments, a record of the first entity's ownership may be maintained in the PEAC note datastructure 125 (e.g., in a multi-valued owner identifier field, in a dedicated ownership history field, or the like).

In some embodiments, the transfer request 133 may not specify a particular PEAC note (e.g., by UCNID), but instead, may specify that PEAC notes in amounting to a particular value are to be transferred (e.g., transfer six (6) dollars to entity 134). In this case, the transaction provider 120 may be configured to identify PEAC notes 126 owned by the first entity 132 that amount to the requested value. If the PEAC notes can be identified (e.g., if the first entity 132 owns sufficient PEAC notes to fulfill the transfer request 133), the transfer may proceed as described above.

Alternatively, or in addition, the transaction provider 120 may be configured to automatically exchange one or more PEAC notes owned by the first entity 132 for PEAC notes of the requested type and/or amounting to the requested transfer amount. For example, the transaction provider 120 may exchange a twenty (20) dollar PEAC note owned by the first entity 132 for one (1) ten-dollar PEAC note, a five-dollar PEAC note, and five (5) one-dollar PEAC notes, and to transfer ownership of the five-dollar PEAC note and one (1) one-dollar PEAC note to the second entity 134. Other exchanges may be made. For instance, the transaction provider 120 may be configured to exchange PEAC notes representing United States currency for PEAC notes representing Canadian currency, transfer partial ownership in one or more PEAC notes, and so on.

The transfer request 133 may comprise a unique identifier UEID of the transferee (e.g., the UEID of the second entity 134). The UEID of the second entity 134 may be an email address of the second entity 134, a DN of the second entity 134, or any other identifier. Alternatively, or in addition, the second entity 134 may establish one or more aliases with the transaction provider 120. The aliases may provide for redirection of transfers to a particular unique identifier to another unique identifier. For instance, an alias may specify that transfers directed to "john.doe.alias" be redirected to "john.doe@openid.org." Therefore, a transfer request specifying a transfer to "john.doe.alias" may result in a transfer to "john.doe@openid.org." The first entity 132 may or may not be informed of the identifier associated with the alias (e.g., the first entity 132 may never know the true identity of the second entity 134). The first entity 132 may use a similar alias, which may, or may not, be disclosed to the second entity 134.

After processing the transfer request 133, the transaction provider 120 may be configured to transmit a record of the transaction to the first entity 132, the second entity 134, and/or the institution 110. In addition, the transaction provider 120 may store a record of the transaction in the datastore 124 (e.g., in a table or other data structure adapted to store transaction records) and/or may generate a tangible record of the transaction (e.g., a paper receipt). The transaction request 133 may specify how the record of the transaction is to be processed (e.g., may specify confirmation email addresses, a physical address where a receipt may be mailed, and so on). The transaction provider 120 may be configured to provide recording of transaction requests that are fulfilled and/or of transaction requests that are not fulfilled (e.g., due to insufficient funds, non-ownership of currency, or the like).

The transaction provider 120 may provide for additional transaction types. As described above, the transaction provider 120 may allow PEAC notes to be exchanged (e.g., converted into different denominations, currency types, or the like). For example, the first entity 132 may be the owner of a twenty-dollar PEAC note associated with a corresponding physical currency note 114 in the currency reserve 112. The first entity 132 may submit request to the transaction provider 120 to exchange the PEAC note for two (2) ten (10) PEAC notes. The transaction provider 120 may authorize the request as described above and, if the exchange request 133 is authorized, the transaction provider 120 may transfer ownership of the twenty-dollar PEAC note from the first entity 132, and may transfer ownership of the second set of PEAC notes to the first entity 132. The original PEAC note (the twenty-dollar PEAC note) may be transferred to another entity, such as the institution 110, the transaction provider 120, or other exchange entity, which may be the source of the second set of PEAC notes. If the twenty-dollar PEAC note is associated with an asset (e.g., custodial account), the transfer may comprise exchanging the PEAC notes as described above or, in some embodiments, may comprise taking the twenty-dollar PEAC note out of circulation (discussed below), and reissuing replacement PEAC notes associated with the asset.

The transaction provider 120 may provide for any type of currency exchange. For example, the first entity 132 may exchange United States currency for currency of another type or denomination (e.g., Canadian currency, Euros, or the like). In this case, the institution 110 may include a currency reserve 112 comprising different types of currency. Alternatively, or in addition, the transaction provider 120 and/or institution 110 may be communicatively coupled to additional currency reserves (not shown) in one or more foreign locales (e.g., in Canada, the European Union, and so on). In some embodiments, properties of a PEAC note (ownership history, promotional information, and the like) may be applied to the exchanged PEAC notes.

The system 100 may include multiple institutions, each of which may "back" PEAC notes with physical currency notes and/or assets. The system 100 includes a second institution 118, which, like the institution 110, may participate with the transaction provider 120 to electronically circulate currency as described above. For example, the second institution 118 may have a custodial account 117 against which PEAC notes are issued and circulated by the transaction provider 120 as described above.

The second institution 118 may comprise a transfer account 115. A transfer account 115 may be any financial account known in the art including, but not limited to: a checking account, a savings account, a depository account, or the like. The transfer account 115 may be owned by a particular entity 132 within the second institution 118, which may comprise a bank, credit union, or the like and may (or may not). The entity 132 may own the account 115 and register it with the transaction provider 120, such that transaction provider 120 may transfer ownership of PEAC notes to/from the account 115 (e.g., the account 115 may be a "transfer entity" which may transfer and/or receive ownership of PEAC notes). The account 115 may be identified as a transfer entity using a public identifier (UEID), as described above.

When ownership of a PEAC note is transferred to the account 115, the transaction provider 120 may be configured to remove the transferred PEAC note from electronic circulation (update the datastore 124) and deposit the value represented thereby into the transfer account 115. Accordingly, the transfer account 115 may be a quick way of getting money out of electronic circulation (redeeming PEAC notes).

If the transferred PEAC note is associated with an asset (e.g., custodial account 111), the value represented by the PEAC note may be transferred from the custodial account 111 (or some other source) to the transfer account 115. If the transferred PEAC note is associated with a particular, physical currency note (e.g., currency note 114), the notes may be removed from the appropriate currency reserve (e.g., reserve 112), and the currency note 114 (of equivalent thereof) may be transferred into the account 115. Alternatively, ownership of the transferred PEAC notes may pass to the transaction provider 120 (or another entity e.g., the institution 110 or 118), and an equivalent value may be transferred to the transfer account 115 (effectively increasing the amount of currency electronically circulated by the transaction provider 120).

The transfer account 115 may also be used to put PEAC notes into circulation. For example, when value (e.g., twenty dollars) is transferred from the transfer account 115 and into electronic circulation (to a particular entity 130), the transaction provider 120 may add PEAC notes (or equivalents thereof), which may comprise transferring the value from the transfer account 115 into a custodial account (e.g., account 111), generating new PEAC notes in the datastore 124 (or accessing existing PEAC notes), and transferring ownership of the PEAC notes the entity 130 (effectively increasing the amount of currency electronically circulated by the transaction provider 120). Alternatively, the transfer may comprise transferring currency (or equivalent value) to the institution 110, the institution adding physical currency notes to the reserve 112, and transferring ownership of PEAC notes derived therefrom to the entity 130.

As discussed above, in some embodiments, the second institution 118 may act as a custodian for an asset (e.g., account 117) which may be associated with PEAC notes circulated by the transaction provider 120. The accounts 117 and 111 may be linked to one another, such that secure transfers may be performed therebetween (e.g., using "on-us" transfers). Alternatively, or in addition, the institutions 110 and 118 may share a pooled custodial account (e.g., custodial account (111, 117) (or other shared asset or account)) against which PEAC notes may be generated and circulated by the transaction provider 120 as described above.

When ownership of a PEAC note held by a first institution (e.g., institution 110) is transferred to a second institution (e.g., institution 118), the linked accounts 111 and 117 (and/or the pooled custodial accounts 111 and 117) may be updated to reflect the transfer. For example, an entity 132 may own a PEAC note that is "backed" by the account 111 of the first institution 110. The entity 132 may transfer this PEAC note to the second institution 118. The transfer may proceed as described above (e.g., ownership of the PEAC note may be transferred from the entity 132 to the institution 118). Following the transfer, the institution 118 may request that the asset associated with the transferred PEAC note (currency note or account value) be transferred to the second institution 118. Responsive to the request, the first institution 110 may transfer the value of the transferred PEAC note from the custodial account 111 to the institution (e.g., to the linked custodial account 117 via an "on-us" transfer). Alternatively, if a pooled account (111, 117) is in use, the pooled account (111, 117) may be updated to transfer the value of the transferred PEAC note from the first institution 110 to the second institution 118. The PEAC datastructure of the transferred PEAC note may be updated to indicate that the second institution 118 is now the custodian of the PEAC note and/or that the account 117 is now backing the PEAC note.

If the transferred PEAC note is tied to a particular, physical currency note held in the currency reserve 112 of the first institution 110 (e.g., currency note 114), the first institution 110 may remove the note 114 (or an equivalent) from the reserve 112 and transfer the note (or the equivalent) the second institution 118. The transfer may comprise removing the PEAC note from circulation (unless the physical note 114 is transferred to a currency reserve (not shown) of the second institution 118). If the physical currency note 114 is transferred (or a pooled currency reserve (not shown) is in use), the PEAC datastructure may be updated to indicate that the second institution 118 is now the holder of the note.

The transaction provider 120 may be leveraged to track certain types of payments or transactions using, inter alia, an invoice datastructure 128. An invoice datastructure 128 may be assigned an identifier (referred to generally as a unique invoice identifier or (UIID)). Like the UCNIDs discussed above, a UIID may be embodied as URL and, as such, may be accessible to the entities via the network 140. The transaction provider 120 may provide "invoice" interfaces (web pages), which, like the PEAC note interfaces discussed above, may be accessed via the Internet using the invoice UIID.

An invoice datastructure 128 may represent a potential transaction between two or more entities 130; the datastructure 128 may identify a payee entity (transferee entity), a payer entity (transferor entity), and an invoice amount. The payee entity may identify the entity 130 who is to receive a payment under the invoice, and the payer entity may identify the entity 130 that is make the payment under the invoice. The invoice amount may identify the value (in a particular currency or denomination) to be transferred under the invoice.

An invoice data structure 128 may further include information describing the transaction, such as the sale of a product, procurement of a service, or the like. Accordingly, an invoice data structure 128 may include a link to an auction, a product description, a service description, provide terms of sale (e.g., delivery date, purchase terms), terms of service (license agreement, etc.), and the like.

The invoice payer may transfer one or more PEAC notes to the invoice datastructure 128. Transferring PEAC notes to an invoice may comprise transmitting a transfer request (e.g., request 133) to the transaction provider identifying the invoice (e.g., by UIID) as the recipient. Responsive to the request, the transaction provider 120 may transfer ownership of the PEAC notes to the payee identified in the invoice datastructure 128, and may modify the invoice data structure 128 to indicate that the invoice has been paid (e.g., set invoice payment field of the datastructure 128 to "paid"), Accordingly, when the payer pays an invoice (e.g., transfers PEAC notes to a UIID), the entity identified as the invoice payee may be given ownership of the transferred PEAC notes, and the invoice datastructure 128 may show proof of payment.

The invoice data structure 128 may further comprise fields to record the UCNIDs of PEAC notes transferred to the invoice (e.g., the PEAC notes transferred by the payer to the UIID of the invoice). Therefore, both the invoice payer and payee may determine how and when a particular invoice was paid. As such, invoices 128 may be used to track inbound payments (e.g., for order fulfillment, accounts payable, etc.), as well as outbound payments (e.g., act as a proof of purchase, receipt, or the like).

The transaction provider 120 may provide an interface (or other mechanism) for generating an invoice datastructure 128. As discussed above, an invoice 128 may include a payer, a payee, an invoice amount, invoice details, and so on. An entity (e.g., first entity 132) may issue a request to the transaction provider 120 to create an invoice datastructure 128. The request may identify the invoice payee (e.g., the first entity 132, or some other entity 130), invoice details, and so on. In response to the request, the transaction provider 120 may generate an invoice data structure 128 comprising a unique invoice identifier (UIID). As discussed above, the UIID may comprise and/or be associated with a URL, which may allow entities 130 to access the invoice via the network 140 (e.g., as a web page).

In one example, an invoice datastructure 128 may be generated by a first entity 132 to invoice a second entity 134 for an identified product or service. The invoice datastructure 128 may indicate the invoice amount and provide details regarding the transaction (e.g., identify a particular product, service, or the like). The transaction provider 120 (or the first entity) may issue a notification message to the second entity 134 to inform him/her of the invoice. The second entity 134 may transfer PEAC notes to the invoice, by inter alia issuing a transfer request 133 to transfer PEAC notes in the amount specified in the invoice datastructure 128 to the invoice UIID. The transfer request 133 may be handled similarly to the entity-to-entity transfer discussed above. The transaction provider 120 may determine whether the request is authorized (as described above) and may transfer ownership of the identified PEAC notes to the payee identified in the invoice datastructure 128, as described above. In some embodiments, the transfer may comprise setting a "payer" field of the invoice data structure 128 to indicate that the entity 132 paid the invoice. The transfer may further include the transaction provider 120 updating a payment field of the invoice datastructure 128 to indicate that the invoice has been paid (e.g., by setting a paid indicator to "true," providing UCIDs of the PEAC notes used to pay the invoice, or the like).

In another example, the first entity 132 may generate an invoice datastructure 128 that does not identify any particular entity 130 as the invoice payer. This type of invoice may represent an "open offer" available to any entity 130; and, as such, any entity 130 may accept the offer by fulfilling the terms of the invoice (e.g., transferring the required invoice amount thereto). Therefore, any entity 130 may transfer PEAC notes to the invoice (generate a transfer request 133 directed to the UIID) and, upon receiving payment, the first entity 132 may provide the product or service specified in the invoice datastructure 128 (or as directed by the entity identified as the payer in the invoice data structure 128).

In some embodiments, the PEAC notes maintained by the transaction provider 120 may be associated with promotional information, which may include promotional assets, branding information, or other metadata. For example, a PEAC note associated an institution 110 may comprise promotional information to "brand" the note with an image or watermark identifying the institution 110.

Alternatively, or in addition, co-branding information may identify the payer of the PEAC note (or other related entity). The entity 130 that owns or issues a PEAC note may be given the right to associate the PEAC note with promotional information, such as a coupon, discount code, graphical elements, video, one or more links, or the like. For instance, an entity 134 may pay a rebate to another entity 132 using a PEAC note. The entity 134 may include a promotional message identifying the rebate provider and/or providing additional promotions with the PEAC note before transferring ownership to the entity 132. For example, the promotional information may state, "thank you for purchasing widget A from manufacturer B please enjoy your rebate and get a twenty percent discount on a future purchase of B's products." When the entity 132 views the PEAC note (in an interface, such as the interface 3E discussed below), the promotional information may be displayed. Similarly, if a discount is offered, the discount may be available to the second entity 132 when the PEAC note is used to make a purchase of "B's products" and/or when the second entity 132 follows a link embedded within the promotional information.

In some embodiments, the transaction provider 120 may comprise a promotion manager 123, to manage associations between PEAC notes 126 and promotional information. Promotional information and/or associations between promotional information and PEAC notes may be stored in the datastore 124 in a dedicated promotional information data structure (not shown) and/or within PEAC note datastructures 126

The promotion manager 123 may manage associations between particular PEAC notes and promotional assets using the datastore 124 (e.g., in the PEAC note datastructures 126 and/or in separate datastructure(s) linked thereto). As such, the promotional information may remain associated with a PEAC note when it is transferred from entity-to-entity. In some embodiments, certain promotional information may only persist through a pre-determined number of ownership transfers and may be removed after being transferred a threshold number of times (or after a predetermined amount of time). Alternatively, the promotion information may remain associated with a PEAC note until removed (as determined by the promotion manager 123).

In some embodiments, promotional information may be retained when a PEAC note is exchanged for PEAC notes of other types or denominations (e.g., broken up for "change" as discussed above). For example, the transaction provider 120 may allow an entity 132 to convert a twenty-dollar PEAC note into a ten-dollar PEAC note, and two, five-dollar PEAC notes; the promotional manger 123 may associate the promotional information associated with the original twenty dollar PEAC note to the new, ten and five dollar PEAC notes.

In some embodiments, the transaction provider 120 (using the promotion manager 123) may allow the owner of a PEAC note to add, remove, and/or modify promotional information associated therewith. For example, the new owner of a PEAC note may remove all or portions of the promotional information applied by its previous owner. In some embodiments, certain portions of the promotional information may be non-modifiable. For example, the transaction provider 120 may not allow promotional information identifying the holder of the physical currency note (e.g., institution 110) to be modified to indicate a different institution. Accordingly, the promotion manager 123 may maintain access control information in association with the promotional information indicative of which entities (e.g., entities 130, institutions 110, 118, and so on) may add, modify, and/or remove various promotional information items. The promotion manager 123 may enforce the access controls by authenticating and applying the access control rules to entities 130 requesting changes to the promotional information.

The transaction provider 120 may allow other entities, which may or may not have had an ownership interest in a PEAC note, to apply promotional information, such as advertising assets, thereto. For example, the transaction provider 120 may sell advertising space on the PEAC notes maintained in the datastructure 126 to a PEAC note "sponsor." FIG. 3E (discussed below) shows one example of an interface for displaying promotional and/or branding information in conjunction with a PEAC note maintained by the transaction provider 120.

The promotion manager 123 may be further configured to validate promotional information associated with a particular PEAC note. For example, PEAC note may be associated with promotional information granting the owner a discount (or other benefit) at a storefront 136. The discount may be activated when the entity 132 follows a link embedded within the PEAC note (e.g., as displayed in an interface, such as the interface 304 illustrated below in FIG. 3E). The storefront 136 may want to verify that the promotion is only used once. In one example, the promotions manager 123 may provide an API through which promotional information may be verified. The API may indicate whether certain promotional information is valid and/or has already redeemed, whether a particular entity 130 is the owner a particular PEAC note, and so on. After a promotion has been redeemed, the storefront 136 may inform the promotion manager 123 via the API, which may mark the promotion as redeemed, remove the promotional information from the PEAC note, modify the promotional information, or the like.

FIGS. 2A-2C depict various examples of datastructures which may be used by the transaction provider 120 to electronically circulate a currency as described above. Although particular datastructures are disclosed herein, the disclosure is not limited in this regard and could be adapted to use any datastructure and/or data representation technique known in the art.

FIG. 2A depicts one example of a PEAC note datastructure 200 that may be used by a transaction provider (e.g., transaction provider 120) to represent a PEAC note associated with a physical currency note, such as the currency note 114 of FIG. 1. In some embodiments, the datastructure 200 may be embodied as database table. However, the disclosure is not limited in this regard and could be adapted to represent the datastructure 200 in any data storage technique known in the art.

The datastructure 200 includes a unique currency note identifier field 210, which may be used to store the UCNID of the PEAC note. As described above, the UCNID may be derived from the serial number (or other attributes) of a particular physical currency note. The UCNID 210 may be embodied as and/or associated with a URL, which may allow a "page" or other interface of the PEAC note to be accessed via a network (e.g., the Internet). In some embodiments, the UCNID 210 may be used as a "primary key" of the datastructure 200 and, as such, may be used to identify and/or reference a specific instance of the datastructure 200.

The datastructure 200 may further include an owner identifier field 212. The owner identifier field 212 may be used to store an identifier (e.g., the UEID) of the owner of the PEAC note. The owner identifier field 212 may be used as another "key" to index the datastructure 200 (e.g., as a primary key, a foreign key, or other indexing data). This may allow for quick identification of the PEAC notes owned by a particular entity.

In other embodiments, the ownership field 212 may comprise a list of partial owners of the PEAC note. In this case, multiple owners may each own a portion (e.g., a percentage) of a PEAC note (e.g., two (2) owners may each own fifty (50) percent of a PEAC note). Each owner may be allowed to transfer his/her ownership interest in the PEAC note independently.

In some embodiments, the owner identifier field 212 may comprise a list that may include the current owner of the PEAC note as well as any previous owners. For example, the current owner of the PEAC note may be placed at the head of the field 212, with the following UEIDs being the previous owners. Alternatively, or in addition, information regarding the ownership history of the PEAC note may be maintained in a separate field (not shown) of the datastructure 200. Other embodiments may selectively omit the ownership history.

In addition, although not shown in FIG. 2A, the data structure 200 may include references (e.g., identifiers, foreign keys, etc.) to records of transaction(s) (e.g., invoices) in which the PEAC note was transferred between entities. The data structure 200 may include a field (not shown) referencing the invoices (or other transaction representations) in which the PEAC note was involved. This may allow for auditing and/or validation of particular transfers by, e.g., tracing the transaction history of a particular set of PEAC notes.

The datastructure 200 may include information describing the PEAC note. A field 220 may identify the PEAC note type and/or PEAC note issuer (e.g., identify the PEAC note as representing a United States dollar, a Euro, or the like). A field 222 may identify the denomination of the PEAC note (e.g., whether the note represents a one (1) dollar bill, a five (5) dollar bill, and so on). Alternatively, or in addition, the UCNID of the PEAC note (stored in field 210) may include the denomination information and/or may be used to validate the denomination information in the field 222. In this way, the denomination may be tied to the UCNID to prevent tampering and/or modification of the denomination field 222. Although not depicted in FIG. 2A, additional fields related to the PEAC note could be included, such as the date the associated physical currency note was deposited in the currency reserve (not shown), and the like.

In some embodiments, the datastructure 200 may include information regarding the currency repository that holds the physical currency note associated therewith. For example, a field 230 may provide a unique identifier of the currency repository (a "UCRID"). The UCRID may be a "key" that may be used to identify a datastructure comprising information about the currency repository (not shown). A currency repository data structure (e.g., database table) could include an address of the currency repository, contact information for the currency repository, the date the associated physical currency note was verified to exist at the currency repository, auditing information (e.g., instructions for performing an audit of the currency repository to ensure that the physical currency note is present at the currency repository), and the like. Alternatively, the datastructure 200 may include information regarding the currency repository directly in one of more fields (not shown).

The datastructure 200 may further include a field 236 for holding promotional information. The field 236 may include and/or link to one or more graphical assets, video assets, links, or the like, which may be displayed and/or otherwise made available in connection with a PEAC note. As discussed above, promotional information may be used for various different purposes including, but not limited to: identifying the holder of the physical currency note (or other asset) associated with a PEAC note, displaying advertising to an owner (or other viewer) of the PEAC note, providing a special offer to an owner of the PEAC note, branding the PEAC note, and so on. Accordingly, the datastructure 200 may include a plurality of promotional and/or branding information fields 236. In some embodiments, the owner of the PEAC note (e.g., the entity identified in the UEID field 212) may be allowed to add, remove, and/or modify the contents of the field 236. Alternatively, the owner may only be allowed to add, remove, and/or modify certain portions and/or types of promotional and/or branding information. For instance, the owner may not be allowed to modify the field 236 identifying the holder of the physical currency note and/or asset associated with the PEAC note. Similarly, if the field 236 includes advertising information paid for by an advertiser (a PEAC note "sponsor"), the field may not be modifiable by the current owner.

FIG. 2B depicts another example of a data structure 201 for representing a PEAC note. The data structure 201 may correspond to a PEAC that is associated with an asset, such as a custodial account or the like (e.g., a "virtual" PEAC note). The datastructure 201 may be embodied as a database table. However, the disclosure is not limited in this regard and could be adapted to represent the datastructure 200 in any data storage technique known in the art.

The datastructure 201 may include a unique currency identifier (UCNID) to uniquely identify the PEAC note. The UCNID 240 may be generated from a set of random data and/or from data configured to prevent ID collisions with other identifiers (e.g., UCNIDs generated from physical currency notes). In some embodiments, the UCNID of a "virtual" PEAC note (a PEAC note associated with an asset rather than a particular, physical currency note) may be indistinguishable (from the perspective of an end user) from the UCNID of a PEAC note represented by the datastructure 200 described above. Alternatively, virtual UCNIDs may be configured to be readily distinguishable from UCNIDs tied to physical currency notes. The UCNID 240 may be embodied as and/or associated with a URL, which may allow a "page" or other interface of the PEAC note to be accessed via a network (e.g., the Internet).

The datastructure 201 may include a currency type field 242 and a denomination field 244. The currency type 242 may indicate type and/or issuer of the PEAC note. The currency type 242 may be determined by the asset (e.g., account) account with which the PEAC note is associated. For example, if the custodial account is in United States dollars, the currency type of PEAC notes tied thereto may be United States dollars, PEAC notes tied to an account in Euros may have a type of Euro, and so on. In some embodiments, the currency type 242 may differ from the currency type of the associated asset (e.g., the asset may be a precious metal that is not directly associated with any particular currency or denomination) In this case, insurance or other provisions (discussed above) may be required to prevent the account from becoming undervalued as a result of changes in currency exchange rates and the like (e.g., if PEAC notes are in Euros and the associated account is in USD, changes in the relative valuation of Euros to USD may cause the value of the PEAC notes to exceed the value of the associated account). The denomination field 244 may indicate a denomination of the PEAC note.

In some embodiments, the denomination 244 may not be tied to an "actual" currency denomination. Accordingly, the PEAC note of datastructure 201 may have a denomination value of three dollars. However, in some embodiments, the denominations 244 of the PEAC datastructure 201 may be restricted to those available in the associated currency.

The account identifier field 246 may identify the custodial account or other asset with which the PEAC note 201 is associated. In some embodiments, the full value of the account number may be omitted of obscured (e.g., by a hash function) to prevent tampering with the account or asset.

The account custodian identifier ACID 248 may identify the custodian or institution responsible for the asset (e.g., custodial account), which may comprise identifying the bank, credit union, or other entity that is responsible for maintaining the asset (e.g., the entity how act as the custodian for the custodial account).

The datastructure 201 may include an owner identifier field 212, which may operate similarly to the field 212 described above to indicate the current owner of the PEAC note represented by the datastructure 201 and/or to provide ownership history information. The datastructure 201 may comprise promotional information 236, which may comprise and/or link to promotional information associated with the PEAC note as described above.

FIG. 2C depicts an example of one embodiment of datastructure 202 for representing an invoice, which may be maintained by a transaction provider, such as the transaction provider 120 of FIG. 1. The datastructure 202 may be embodied as a database table. However, the disclosure is not limited in this regard and could be adapted to represent the datastructure 200 in any data storage technique known in the art.

The invoice data structure 202 may include a unique invoice identifier (UIID) 250, which may be embodied and/or associated with a URL. The URL may allow entities to reference the invoice data structure 250 via the Internet (e.g., using a web browser or the like). An invoice payment field 251 may indicate if the invoice has been paid. The invoice payment field 251 may comprise a simple "true" or "false" indicator. Alternatively, or in addition, the payment field 251 may comprise the UCIDs of the PEAC notes transferred to pay the invoice, provide a date of payment, and so on.

An invoice amount field 252 may indicate the amount of PEAC note value (in a particular denomination) that is to be transferred under the invoice. In some embodiments, the amount field 252 may further include a list of preferred denominations, currency types, and so on.

An invoice details field 254 may provide a description of the invoice, including a detailed description of the invoice amount 252. For example, the details field 254 may identify a product or service associated with the invoice (e.g., provide a link to an auction or catalog), may provide terms of a purchase, may provide terms of service, provide itemized cost information used to calculate the invoice amount 252, and so on.

An invoice payee field 256 may comprise a UEID of the payee under the invoice (the entity who is to retain ownership of any PEAC notes transferred to the invoice). The invoice payer field 258 may comprise a UEID of the payer under the invoice (the entity from which the PEAC note(s) are to be transferred or the entity who ultimately transfers PEAC notes to the invoice). In some embodiments, the payer UEID field 258 may be populated when the invoice data structure 202 is created. In this case, the invoice 202 may be directed to a particular entity. Alternatively, the payer UEID field 258 may not be populated until the invoice is actually paid, at which point the payer UEID field 256 may be populated with the UEID of the entity who transferred the PEAC notes to pay the invoice. When processing a transfer to an invoice, a transaction provider may only accept payment from the entity identified in the payee field 258 (e.g., a first entity may not be allowed to pay the invoice of a second entity). Alternatively, the transaction provider may allow any entity to transfer PEAC notes to the invoice (e.g., a first entity may pay the invoice of a second entity). In some embodiments, the payee UEID 256 and/or the payer UEID 258 may or may not be visible to other entities (e.g., the invoice payer may not know the identity of the payee and vice versa).

Referring to FIG. 1, the transaction provider 120 may be configured to provide various interfaces to the entities 130 (and/or institutions 110 and 118) for managing the PEAC notes circulated thereby. The interfaces may be provided via the network 140 as browser-renderable markup (e.g., HTML). Accordingly, the transaction provider 120 may comprise one or more web servers or other server component(s), each comprising respective processors, memories, computer-readable storage medium, and the like. The transaction provider 120 may be implemented in a clustered configuration (e.g., may comprise a plurality of computing devices in a single location and/or distributed geographically). However, the disclosure is not limited in this regard, and could be adapted to use any type of interface and/or interaction technique known in the art. For example, the transaction provider 120 may be configured to interact with the entities 130 and/or institutions 110, 118 using stand-alone applications (and/or applets) running on the computing devices thereof. For example, a cellular phone (or smart phone) of an entity 134 may implement an application (or applet) configured to interface with the transaction provider and/or present the interfaces thereof.

FIGS. 3A-3E depict exemplary embodiments of various interfaces provided by the transaction provider 120. The interface components depicted in FIGS. 3A-3E may allow the entities 130 to view the PEAC notes maintained by the transaction provider 120, to view the PEAC notes owned by each entity (e.g., show a "wallet" of an entity's PEAC notes), provide for the exchange of PEAC notes, transfer PEAC notes to other entities 130, view the ownership status PEAC notes, view the ownership history PEAC notes, view a record of transactions performed by the transaction provider 120, and so on.

In some embodiments, access to information presented in the interfaces of FIGS. 3A-3E may be protected by access controls, which may operate as described above (e.g., using a third-party service 150 or the like). For example, in some embodiments, an interface displaying information regarding a particular entity 130 (showing the PEAC notes owned thereby) may be restricted to the particular entity 130. For example, only the first entity 132 and/or those entities authorized by the first entity 132 may be allowed to view certain information about the PEAC notes owned by the first entity 132. In other embodiments, access to ownership information may be provided to all interested entities 130. Similarly, access to records of transactions performed by the transaction provider 120 (e.g., information regarding pending or completed invoices) may be restricted to the one or more entities 130 that are/were parties in the transaction. For example, access to an interface displaying information regarding a transaction between the first entity 132 to the second entity 134 may be restricted to the first entity 132, the second entity 134, and/or to those entities 130 authorized by the first and/or second entities 132 and/or 134. Alternatively, access may be open to all interested entities.

Figures 3A, 3B:
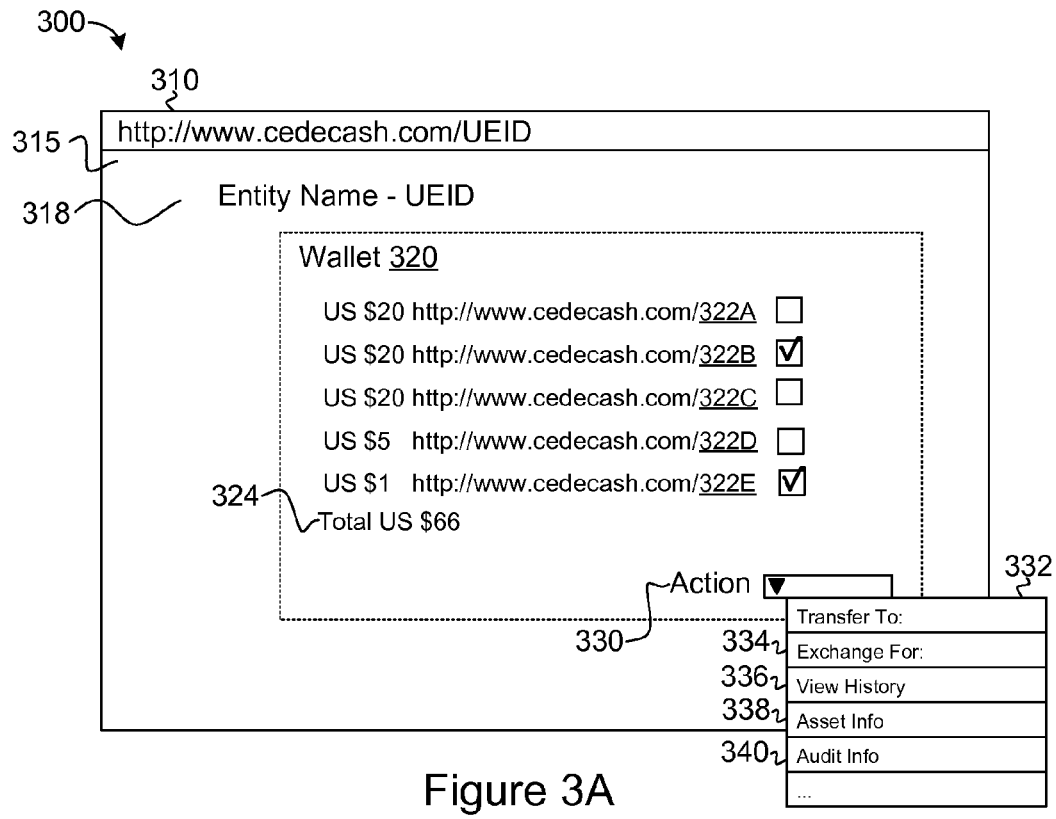
FIG. 3A depicts one embodiment of a transaction provider interface.
FIG. 3B depicts one embodiment of another transaction provider interface.

FIG. 3A shows one embodiment of an interface 300 adapted to display information regarding a particular entity (as identified by the entity name UEID field 318 and/or URL 310). The interface 300 may be provided by the transaction provider 120 as described above (as browser-renderable markup, or in another form). The interface 300 may adapted for display in a browser window 315 (and/or other application) and may be accessible using the UEID of the entity 318 (via URL 310).

As disclosed above, in some embodiments, access to the interface 300 may be restricted to the entity identified by the UEID 318 (or other entities authorized thereby). Access may be controlled via an authentication interface (not shown), whereby entities may authenticate their identity directly to a transaction provider and/or through a third-party service as described above.

Figure 3C:
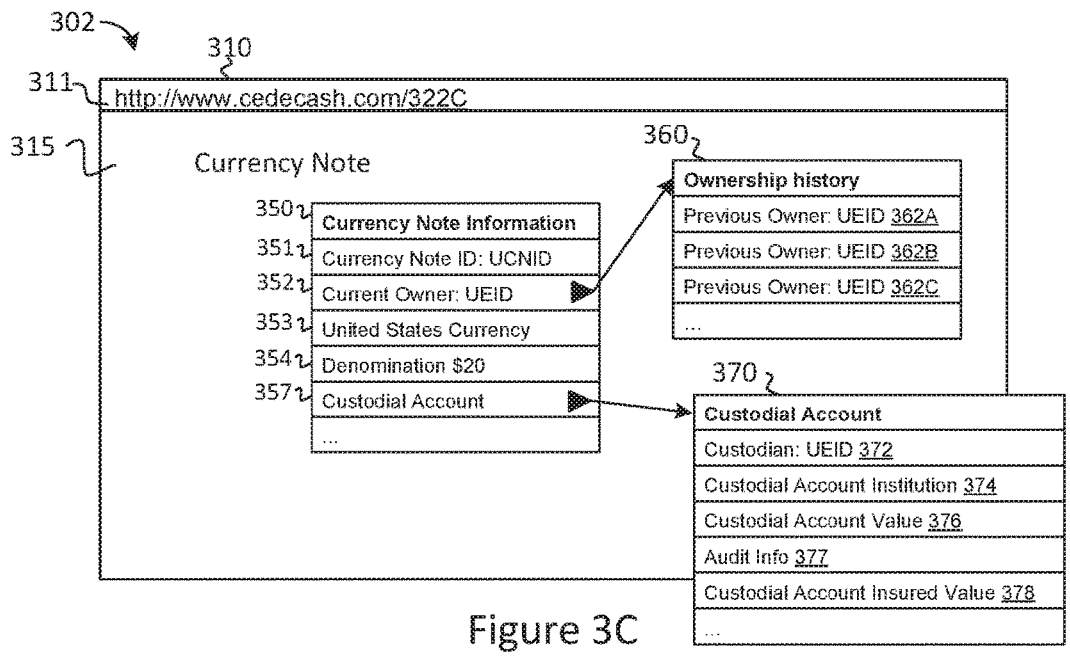
FIG. 3C depicts one embodiment of another transaction provider interface.

The interface 300 may include a listing (e.g., wallet 320) of PEAC notes 322A-322E owned by the entity 318. The wallet 320 may display the total value 324 of the entity's PEAC notes 322A-322E. Although the wallet 320 of FIG. 3A depicts a list of PEAC notes 322A-322E, the disclosure is not limited in this regard. In some embodiments, the wallet 320 may display the PEAC notes 322A-322E as a collection of graphical images, tabs, or the like. A graphical display of a PEAC note may include a display of promotional information associated therewith (e.g., graphical assets, offer codes, links, branding information, etc.); FIG. 3E discussed below provides one example of an interface 304 comprising promotional information.

An action control 330 may allow the user to electronically circulate (e.g., transfer ownership) of the PEAC notes 322A-322E, while maintaining the asset(s) associated therewith their respective custodians. Additionally, the action control 330 may allow the user to "redeem" PEAC notes, which may remove the note(s) from electronic circulation as described above. The interface user may manipulate the action control 330 may perform a selected action (e.g., action 332-340) on one or more selected PEAC notes 322A-322E. As shown in FIG. 3A, PEAC notes 322A-322E may be selected using respective check-box inputs. However, the interface 300 could include any interface component and/or selection mechanism known in the art.

The transfer action 332 may cause a transfer request to be transmitted to the transaction provider. Selection of the transfer action 332 may allow the user of the interface 300 to provide an identifier of the entity to which the selected PEAC notes are to be transferred (e.g., an email address, distinguished name, alias, or the like). In some embodiments, the interface 300 may provide a look-up mechanism whereby an identifier of a particular entity may be found (e.g., using a directory of the transaction provider, a list of recently used entities, or the like). The transfer action 332 may transfer ownership of the selected PEAC notes to the specified entity as described above (e.g., ownership of the PEAC notes 322B and 322E may be transferred to the specified entity).

A user may access the interface 330 to withdraw PEAC notes from electronic circulation (e.g., transfer currency into another, non-electronically circulated account, such as a checking or savings account). In one embodiment, a user may establish an entity corresponding to transfer account (e.g., transfer account 115 discussed above). The transfer account may be assigned a public identifier (e.g., a UEID and/or URL). Accordingly, transfers to/from the transfer entity may cause PEAC notes to be withdrawn or added to electronic circulation as described above.

In some embodiments, the transfer action 332 may be configured to allow the user to enter a currency amount to be transferred (e.g., eight (8) U.S. dollars). Responsive to this request, a transaction provider (or other service) may be configured to automatically exchange one or more PEAC notes for the user to obtain PEAC notes in the proper denomination(s) to transfer the requested amount. For example, the transaction provider may automatically exchange a U.S. twenty (20) dollar PEAC note for a ten (10) dollar PEAC note, a five (5) dollar PEAC note, and five (5) one (1) dollar PEAC notes. From these exchanged notes, the transaction provider may transfer the five (5) dollar PEAC note and three (3) one (1) dollar PEAC notes to the specified entity. If a PEAC note in the desired denomination does not exist (e.g., a transfer or fifty cents ($0.50) is requested), the transaction provider may provide for a transfer of a partial interest in a PEAC note (e.g., transfer of one-half ownership in a one (1) dollar PEAC note). Similarly, an automatic exchange to another currency type (e.g., from U.S. dollars to Euros) may be made.

The exchange action 334 may allow the user to exchange the selected PEAC notes for one or more other PEAC notes as described above. As discussed above, the exchange may be made for PEAC notes of another denomination. For instance, PEAC notes of a first type (e.g., United States dollars) may be exchanged for PEAC notes of another type (e.g., Euros). Selection of the exchange action 334 may allow the user to specify the denomination and/or currency type to exchange.

The view history action 336 may allow the user to view the ownership history of one or more selected PEAC notes. The ownership history may provide a listing of the one or more entities that have had ownership (or an ownership interest) in the selected PEAC notes (e.g., notes 322B and 322E).

The asset information action 338 may display information regarding the asset associated with the selected PEAC notes (notes 322B and 322E). If the PEAC notes are associated with physical currency notes held in a currency reserve, the asset information action 338 may display information regarding the currency server (e.g., contact information for the currency reserve, or the like). If the PEAC notes are associated with an asset, such as a custodial account, the action 338 may display information regarding the asset, such as institution acting as asset custodian, asset identification (e.g., account number, balance, or the like), and so on.

In addition, an audit information action 340 may provide information regarding an audit the PEAC note asset(s). The audit information may include the last date the physical currency note(s) were verified to be at the currency reserve, may provide an account balance (and/or indicate the last time the account balance was verified), may indicate an insurance level of the asset, or the like.

Although not shown in FIG. 3A, the interface 300 could include additional actions, such as reserve transfer action to request a transfer of selected PEAC notes into/out of electronic circulation, actions to view transaction information (e.g., invoice information), and the like. Similarly, the action control 330 could include an action dedicated to the use of a transfer account (or transfer entity) to quickly transfer PEAC note into/out of circulation as described above.

As disclosed above, each PEAC note maintained by the transaction provider may be assigned a respective UCNID, which, in some embodiments, may comprise a URL or URI. The PEAC notes listed in the wallet 320 each include respective URL identifiers 322A-322E. The URI/URL identifiers may be referenced on a network (e.g., the Internet) to access PEAC note information (e.g., a "web page" of the PEAC note). The transaction provider (or other service) may make information about a PEAC notes accessible using the UCNID thereof (e.g., the URL or URI of the PEAC note).

FIG. 3B is an example of an interface 301 adapted to display information about a PEAC note. The interface 301 may be provided by the transaction provider (or other service) in response to a request for information about a particular PEAC note (by UCNID or URL 310). For example, in some embodiments, the interface 301 may be accessed directly by inputting the UCNID (URL) 311 of a PEAC note (e.g., 322A) into a browser 315.

The interface 301 may include, but is not limited to: a display of the PEAC note identifier 351, a display of the current owner 352, a display of the currency type 353 (e.g., United States dollars, Euros, etc.), a denomination indicator 354, and/or information regarding asset 355 associated with the PEAC note (e.g., information regarding a currency reserve and/or asset custodian).

The ownership information 352 may provide a display of an ownership history 360. The ownership history 360 may include a listing of the previous owners 362A-362C of the PEAC note 322A. Although not shown in FIG. 3B, additional information, such as references to transactions in which ownership of the PEAC note was transferred, may be provided on the interface 301 (e.g., a list of associated invoices, or the like)

As discussed above, the asset information 355 may provide a link to additional information relating to the asset associated with the PEAC note, such as the currency reserve holding a physical currency note, or the custodian of the associated asset (e.g., custodial account). In the FIG. 3B example, currency reserve display 371 is shown, which may include an identifier of the currency reserve 373 that holds the physical, currency note of the PEAC note 322A (as a UEID), display currency reserve contact information 375, display audit information 377, and so on.

If the PEAC note displayed in the interface 301 is associated with another type of asset (e.g., a custodial account) a different display may be provided. FIG. 3C depicts one example of an interface 302 for displaying information regarding a PEAC note associated with a custodial account. The custodial account display 370 may include an UEID of the account custodian 372, may identify the institution 374 that holds the account (if different than the custodian), may indicate a value of the account 376, display audit information 377, indicate the account insured value 378, and so on. The display 370 may further comprise a "leverage" indicator, which may display a ratio of the account (value 376) to account liabilities (e.g., sum value of the PEAC notes associated therewith less the value of the PEAC notes held by the account custodian).

The transaction provider may be further configured to provide interfaces for displaying information regarding invoice transactions. As discussed above, an invoice (e.g., invoice datastructure 128) may be used to maintain a record of PEAC note transfers; the invoice datastructure 128 may maintain an association between a PEAC note transfer and an agreement (invoice) to provide a product or service. This information may be used by a "provider" entity (payee) to verify payment before providing a particular product or service. Similarly, the invoice information may be used by the "consumer" entity (payer) to prove that he/she paid for a particular product or service.

Figure 3D:
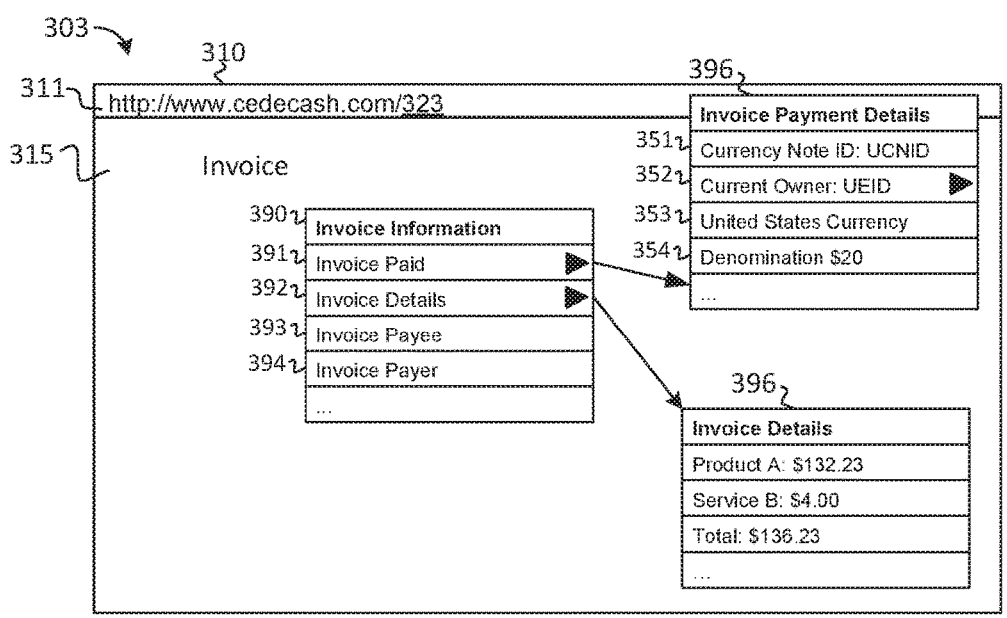
FIG. 3D depicts one embodiment of another transaction provider interface.
Figure 3E:
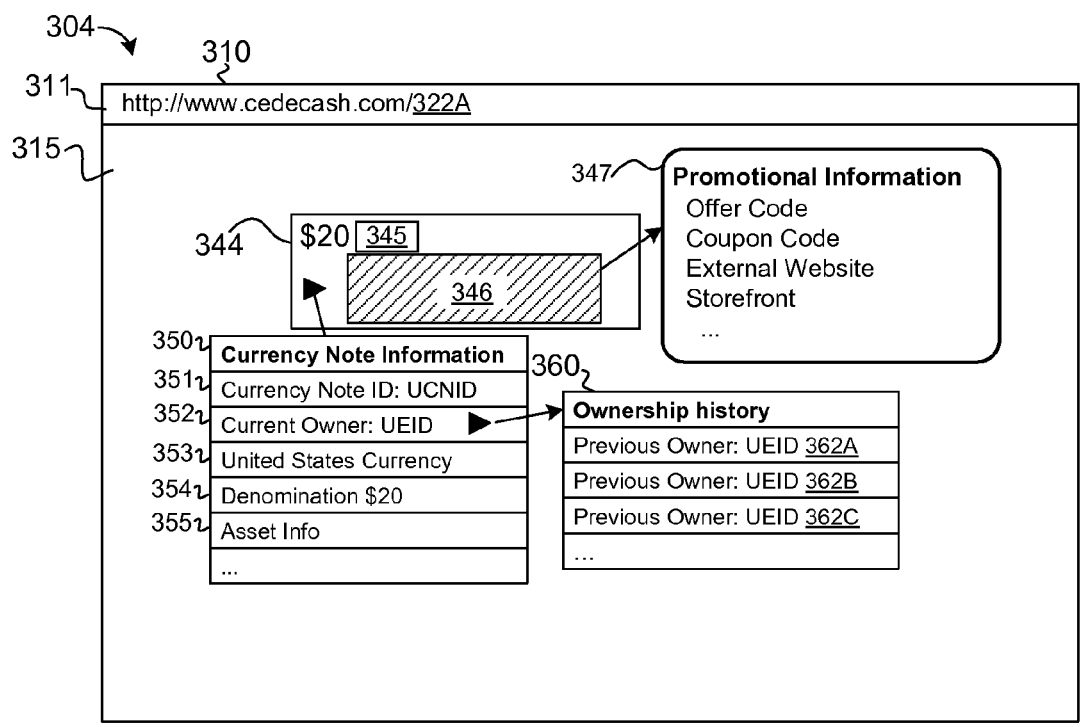
FIG. 3E depicts one embodiment of another transaction provider interface.

FIG. 3D depicts one embodiment of an interface 303 adapted to display information regarding an invoice (e.g., invoice datastructure 128 of FIG. 1 and/or datastructure 202 of FIG. 2C). As discussed above, invoice datastructures may be associated with a unique identifier (UIID), which may allow invoices to be referenced using a URL (or other resource location mechanism) for display in a browser application 315 (or other application). Information regarding an invoice (or other transaction) may be open to the public or (in some embodiments) may be restricted to the transacting entities and/or to entities authorized thereby.

The interface 303 may include an invoice information display 390, which may display information regarding the invoice (identified by UIID 323). The invoice information displayed in 390 may include, but is not limited to: an indicator 371 of whether the invoice has been paid (whether PEAC notes in the amount specified in the invoice have been transferred thereto); invoice details 392, invoice payee indicator 393 (a UEID or alias of the invoice payee); invoice payer indicator 394 (a UEID or alias of the invoice payer (if any)); and so on. In some embodiments, the invoice payee indicator 393 and/or the invoice payer indicator 384 may be omitted from the display 390 and/or may be displayed as aliases (e.g., the invoice payee and/or payer may remain anonymous).

If the invoice has been paid, the indicator 391 may display "paid," or "fulfilled." Alternatively, or in addition, the indicator 391 may provide links to the PEAC notes used to pay the invoice. Information regarding the one or more PEAC notes transferred under the invoice may be displayed in an invoice payment details display 396, which, as described above in conjunction with FIGS. 3B and/or 3C, may provide detailed information regarding the PEAC notes used to pay the invoice. This information may include an indicator of the UCNID 351, currency owner indicator 352 (which may link to ownership history information (not shown)), currency type indicator 353, currency denomination indicator 354, and so on.

The invoice details 392 may display and/or link to information regarding the product or service associated with the invoice. This information may include, but is not limited to: a link to an auction, identification of a particular product or service, and so on. The invoice details display 396 may display additional invoice information, which may include, but is not limited to: the "price" of the invoice, an itemized listing of products or services to be provided under the invoice, terms or service, fulfillment details (e.g., tracking number for a product shipped to the payer), and so on.

FIG. 3E depicts one embodiment of an interface 304 for displaying information regarding a PEAC note. The interface 304 could be used in connection with the other interfaces disclosed herein. For example, the interface 304 (and/or components 390 thereof) could be used to display PEAC notes in the "wallet" display 320 of FIG. 3A.

The interface 304 includes a graphical depiction 344 of a PEAC note. The graphical depiction 344 may be used to display a single PEAC note (as in FIG. 3E) and/or to display a collection of PEAC notes, such as a plurality of PEAC notes in a "wallet" 320 as shown in FIG. 3A, or other listing or collection of PEAC notes. The graphical depiction 344 may include an indicator of the denomination of the PEAC note (e.g., twenty dollars), and may further include branding information 345 identifying the holder of the physical currency note (the currency reserve) and/or the custodian of the asset associated (e.g., as an image, watermark, text, or the like). The depiction 344 may further include a link (or other selection mechanism) to display PEAC note information 350 such as, the note UCNID 351, owner 352, currency type 353, denomination 354, asset information 355, and so on.

The display 344 may include a promotional information display 346, which, as disclosed above, may comprise graphical assets (images, video, multi-media, or the like). The promotional information 346 may comprise an advertisement, a coupon, an offer code, a link, or other promotional assets. In some embodiments, the promotional information display 346 may include a link to additional promotional information 347, such as an offer or coupon code (as selectable text), a link to an external Website, a link to a storefront or audio, or the like. For example, the promotional information 346 and/or 347 may grant the owner of the PEAC note a discount when the PEAC note is used to make a purchase at a particular Website or storefront (e.g., use this PEAC not in a purchase at storefront.com and receive a 20% discount).

The promotional information 346 and/or 347 may be set by a current owners of the PEAC note, by a previous owner of the PEAC note, by a custodian of the asset associated with the PEAC note (a currency reserve, an account custodian, or the like), by a third-party (e.g., an advertiser), or the like.

In some embodiments, the interface 304 may be publically available (e.g., available to anyone who knows the UCNID and/or URL 311 of the PEAC note). Therefore, in some embodiments, the promotional display 346 and/or 347 may include generally applicable promotional information available not only to the owner of the PEAC note, but to anyone accessing the interface 304.

Figure 4A:
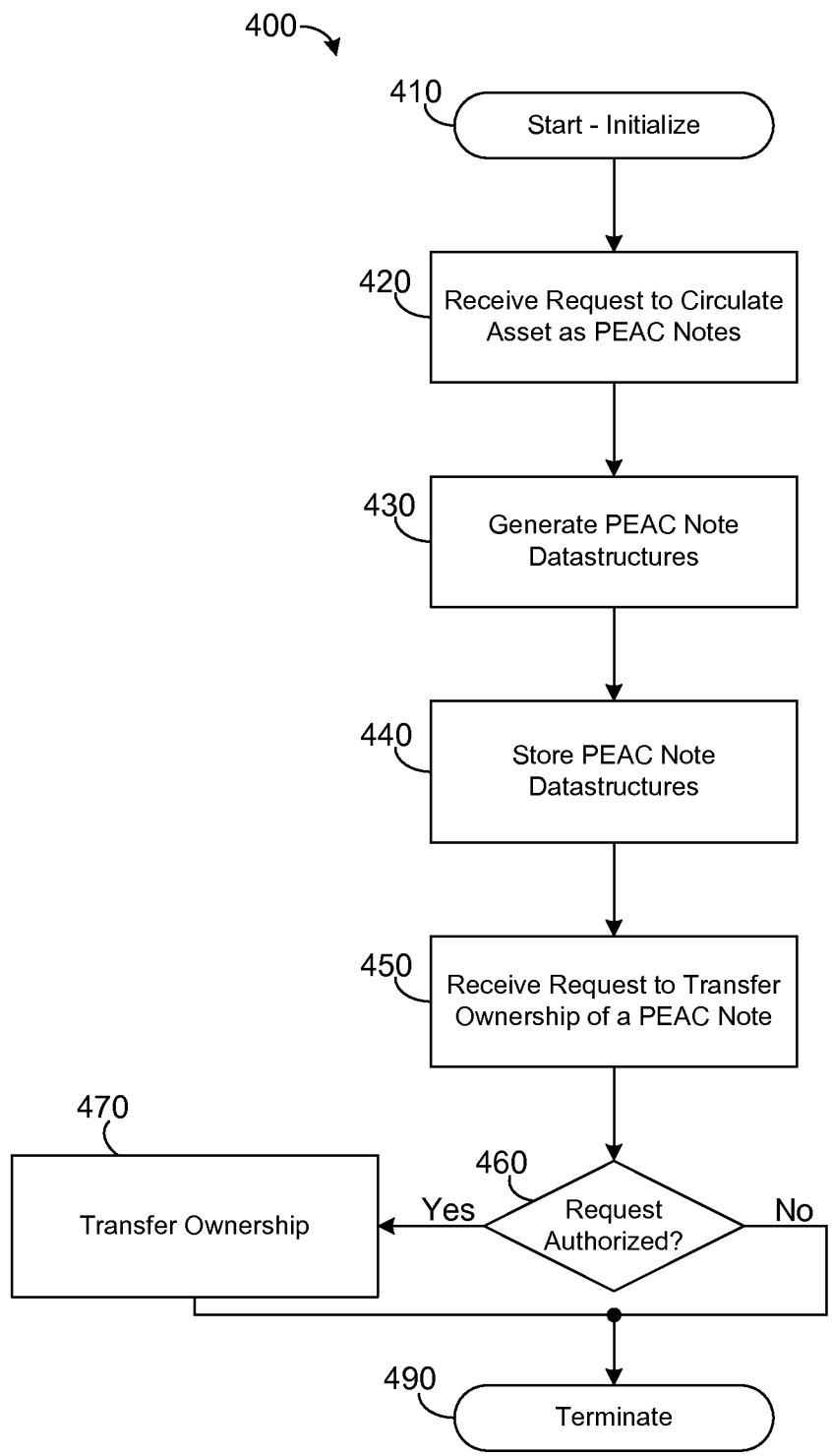
FIG. 4A is a flow diagram of one embodiment of a method for electronically circulating a currency.

FIG. 4A is a flow diagram of one embodiment of a method for electronically circulating a currency. The method 400 may be implemented using one or more computer-readable instructions stored on a computer-readable storage medium and executable by a computing device (such as the computing device(s) comprising the transaction provider 120). The instructions may be embodied as one or more distinct software modules on the computer-readable storage medium. In addition, one or more of the steps of the method 400 may be implemented using hardware components. Therefore, portions of the method 400 may be tied to particular machine components.

At step 410, the method 400 may start and be initialized, which may comprise loading computer-readable instructions from a computer-readable storage medium, accessing one or more hardware components (e.g., communications interfaces, computer-readable data storage medium, and the like), and so on.

At step 420, the method 400 may receive a request to circulate an asset (or set of assets) as one or more PEAC notes. The request may comprise information regarding the asset to use as the basis for one or more persistent, electronically anchored currency notes (PEAC notes). The asset may be one or more physical currency notes stored in a currency reserve, a custodial account, or other asset having a quantifiable value. The information received at step 420 may include, but is not limited to: the currency note type, currency note denominations, currency note serial number, a currency owner of each currency note, information regarding the currency repository of the note, and the like. Alternatively, the information may comprise information relating to a custodial asset, such as a custodial account and may include, but is not limited to: the currency type to be associated with the assets, a base value of the asset (e.g., a minimum insured value, etc.), custodian information, asset risk, asset leverage ratio, desired PEAC note denominations and/or types, and so on.

At step 430, a plurality of PEAC note datastructures may be generated. Step 430 may comprise determining how many and/or the respective values of the PEAC notes. PEAC notes associated with particular, physical currency notes may be assigned the denomination/value thereof. PEAC notes associated with an asset (e.g., a custodial account) may be generated in arbitrary denominations/values; however, the circulating value of the PEAC notes (as determined using Equations 1-4) may be limited by the value of the asset. The information received at step 420 may indicate a set of desired denomination/values.

Step 430 may further comprise generating a UCNID for each of the PEAC notes. In some embodiments, a UCNID may be derived from properties of the associated asset (e.g., serial number of a physical currency note represented by the PEAC note). Alternatively, a UCNID may be securely generated to prevent tampering and/or modification (e.g., may comprise a digital signature or the like). The UCNID may be configured to prevent UCNID collisions.

At step 440, the method 400 may store the PEAC note datastructures in a datastore (e.g., in a datastructure, such as the data structures 126, 200, and/or 201 described in conjunction with FIGS. 1, 2A, and 2B). In addition, at step 440, the PEAC note datastructures may be associated with respective owners. The owners may be one or more entities identified in the request or step 420 (e.g., a particular person, a business, an institution, a transaction provider, or the like). As discussed above, ownership may be set using owner identifier field of the PEAC note datastructure (e.g., field 212 of FIGS. 2A and 2B).

At step 450, a request to transfer a PEAC note from a first entity to a second entity may be received. The request may identify the transferor (the first entity) using a UEID of the first entity (or alias thereof), may identify the transferee (the second entity) using a UEID of the second entity (or alias thereof), and may identify the PEAC note to transfer using a UCNID.

In some embodiments, step 450 may comprise (or be predicated upon) an audit being performed on the custodian of the account associated with the identified PEAC note. The auditing may not occur each time the PEAC note is transferred, but may be required to occur periodically (e.g., after certain time intervals, or the like). As discussed above, auditing may comprise the method 400 verifying that the custodian holds physical currency notes associated with the PEAC note and/or that an asset (e.g., custodian account) has sufficient value to cover the circulating value of the PEAC notes associated therewith. In some embodiments, if the audit fails PEAC notes associated with the failed custodian may be prevented from circulating until the custodian can prove that it is in possession of the associated asset (or account value becomes sufficiently funded).

At step 460, the request may be authorized. Authorizing the request may comprise verifying that the request was submitted by the first entity and/or was authorized by the first entity, verifying that the request was not modified and/or tampered with in transit, and/or verifying that the first entity is the owner of the PEAC note to be transferred. If the request is authorized, the flow may continue to step 470; otherwise, the flow may terminate at step 490. In some embodiments, if the request is not authorized, the requesting entity may be notified of the reason (e.g., you do not own this PEAC note; your identity could not be authenticated, etc.).

At step 470, ownership of the PEAC note may be transferred to the second entity. Transferring ownership may comprise associating the second entity (e.g., a UEID of the second entity) with the PEAC note (e.g., in the PEAC note datastructure). In addition, a UEID of the first entity may be added to a list of previous owners of the PEAC note. The transfer may occur while maintaining the asset associated with the PEAC note (e.g., the physical currency note or other asset) with its custodian.

The transfer of step 470 may be to a transfer entity (e.g., transfer account). As described above, transferring ownership of a PEAC note to a transfer entity may cause the PEAC note to be removed from electronic circulation and the value thereof transferred into the account referenced by the transfer entity. As discussed above, the transfer comprise transferring physical currency notes (or equivalent thereof) from a currency reserve and/or transferring value from an asset, such as a custodial account. Therefore, step 270 may further comprise transferring value associated with the PEAC note to the transfer entity (transfer account) and removing the PEAC note from circulation (e.g., marking the PEAC note as being non-transferrable).

In some embodiments, the transfer of step 470 may comprise a transfer to an invoice (e.g., the second entity identifier may refer to an invoice identifier or UIID). The ownership transfer of step 470 may be made to the entity identified as the payee under the invoice; the entity identified in a UEID field of the invoice (e.g., field 256 in FIG. 2C). In addition, an invoice datastructure may be updated to indicate that a payment has been made thereto. For example, a payment field of the invoice datastructure may be set to "paid" or "fulfilled," and/or may reference the PEAC notes used make the payment (e.g., by UCNID).

At step 490, the flow may terminate.

Figure 4B:
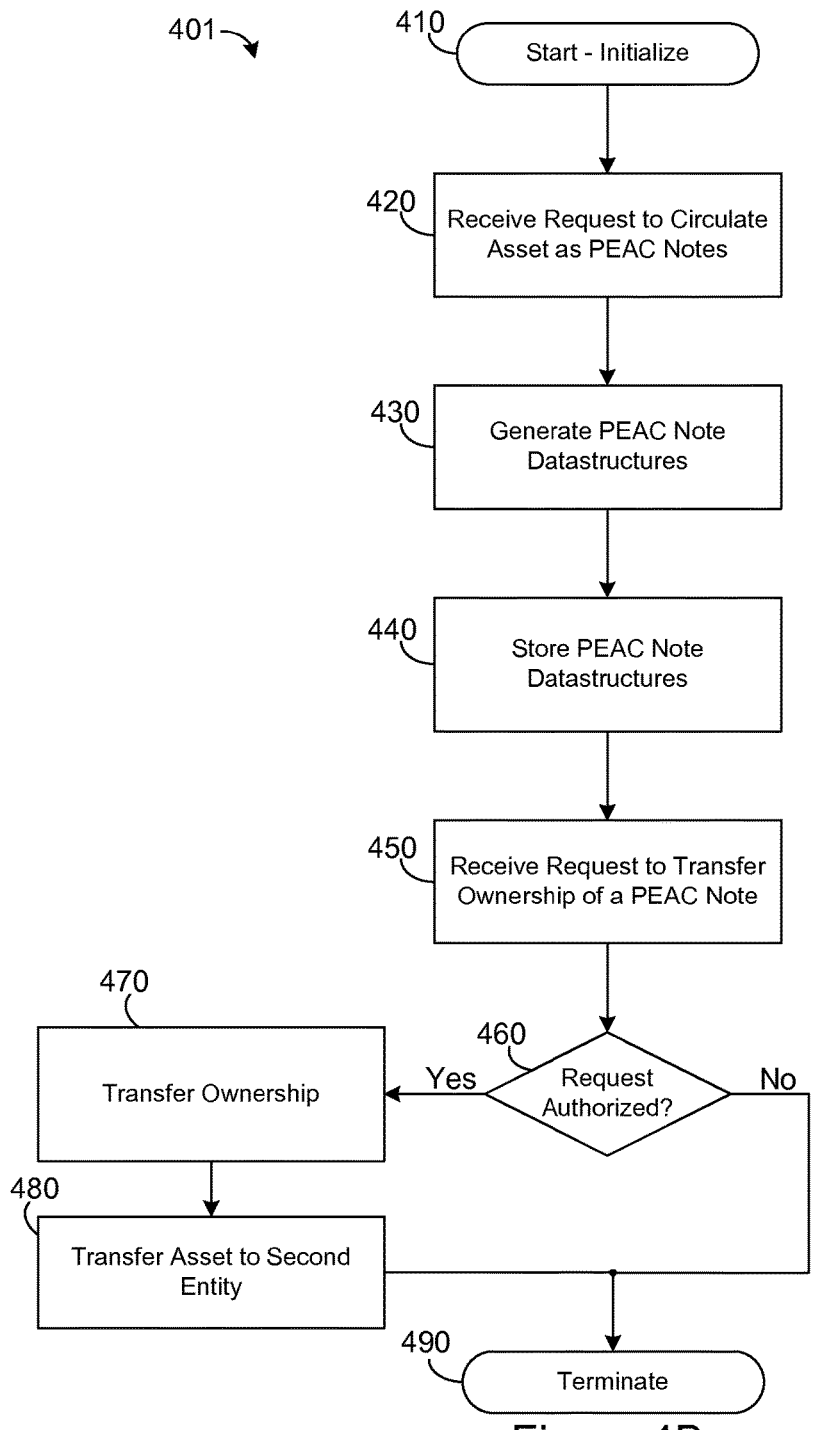
FIG. 4B is flow diagram of another embodiment of a method for electronically circulating a currency.

FIG. 4B is a flow diagram of another embodiment of a method 401 for electronically circulating a currency. In the FIG. 4B example, two or more institutions may have linked accounts and/or may share a pooled custodial account.

At steps 410-440, the method 401 may be initialized, a request to circulate an asset as PEAC notes may be received, and PEAC note datastructures may be generated and stored as described above.

At step 450, a first entity may request to transfer a first one of the PEAC notes to second entity. The second entity may be one of the one or more institutions sharing a linked or pooled account as described above (e.g., the institution 118 of FIG. 1). At step 460, the request may be authorized as described above, and, if the request is authorized, the ownership transfer may take place at step 470 as described above.

At step 480, and following the transfer of ownership at step 470, the second institution, which is the new owner of the PEAC note, may request the asset backing the PEAC note from a holder or custodian of the associated asset. If the PEAC note corresponds to a particular, physical currency note, the second institution may issue a currency transfer request to the entity identified as the currency repository (the identified in field 230 of FIG. 2A). If the PEAC note is associated with another type of asset (e.g., a custodial account), the second institution may issue a transfer request to the account custodian (identified in field 248 of FIG. 2B). As described above, the transfer may be made within linked or pooled accounts and, as such, may be implemented as an "on-us" transfer between the institutions.

The transferring at step 480 may comprise the transferring entity (the entity who owned the physical currency note or was the asset custodian prior to the transfer to the second entity) verifying that the second entity is the current owner of the PEAC note. The verification may proceed similarly to the authorization of step 460 described above.

Step 480 may further comprise the method 401 updating the PEAC note datastructure to indicate that the second entity now holds and/or is the custodian of the PEAC note.

Figure 5A:
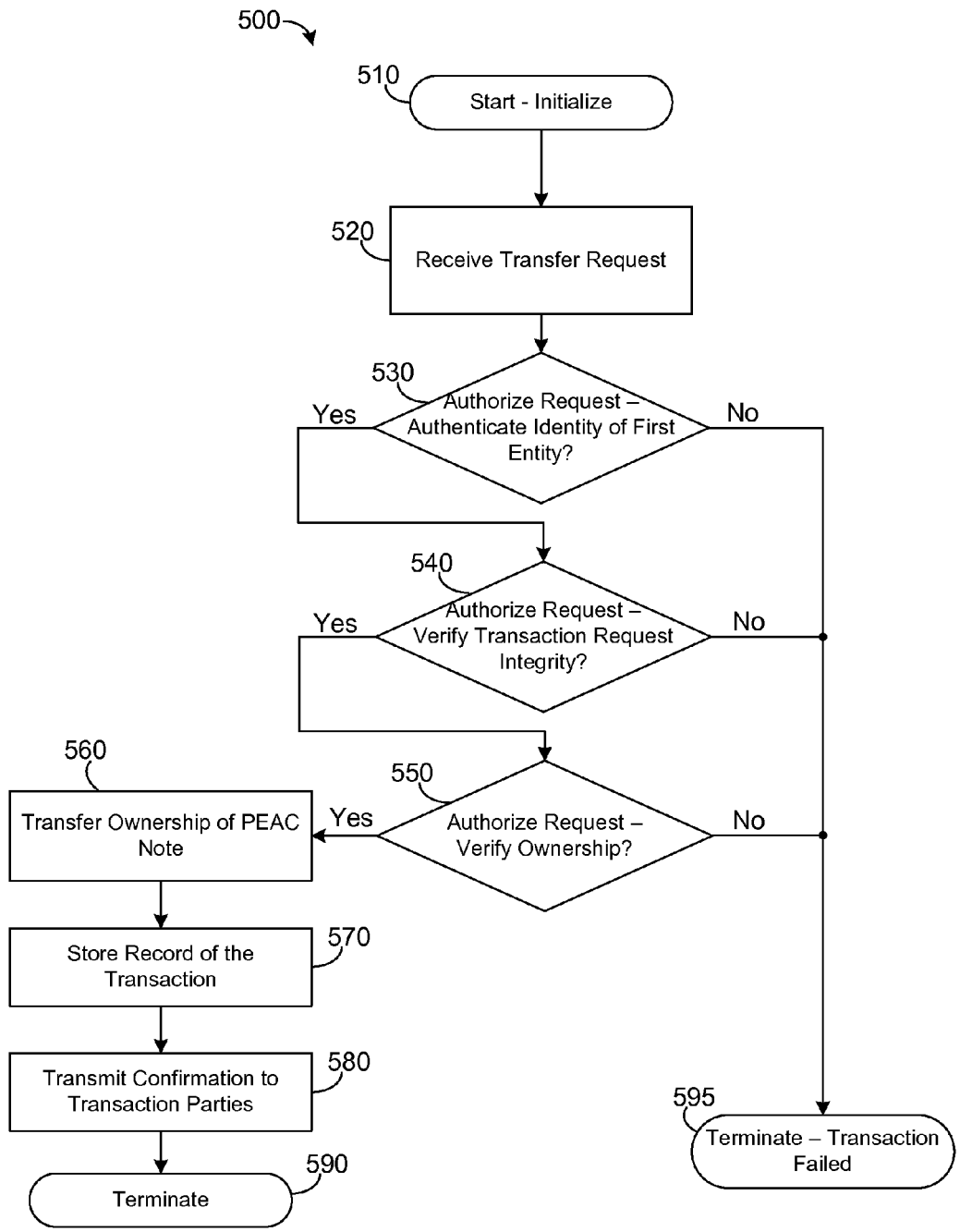
FIG. 5A is a flow diagram of another embodiment of a method for electronically circulating a currency.

FIG. 5A is a flow diagram of another embodiment of a method 500 for electronically circulating a currency. At step 510, the method 500 may start and be initialized as described above.

At step 520, a request to transfer a PEAC note from a first entity to a second entity may be received. The request may be transmitted by and/or authorized by a first entity, may identify one or more PEAC notes to be transferred (e.g., by UCNID of the PEAC notes), and may identify a transferee (e.g., the second entity) using a UEID of the second entity (and/or an alias thereof).

At step 530, the method 500 may authorize the request. Authorizing the request at step 530 may comprise determining whether the first entity transmitted the request and/or whether the first entity authorized the request to be transmitted. Step 530 may comprise receiving from the first entity a credential to authenticate the identity of the first entity. Alternatively, or in addition, step 530 may comprise receiving a credential authenticating the first entity from a third-party service (e.g., an authentication provider, such as an OpenID® provider). The credential may authenticate a session of the first entity with the method 500. Alternatively, or in addition, the credential may be attached to the request itself (e.g., as an HTTP AUTH header, a digital signature, or the like). If the method 500 authenticates the identity of the first entity and/or determines that the first entity authorized the request, the flow may continue at step 540; otherwise, the flow may terminate at step 595.

At step 540, the request may be further authorized, which may comprise verifying that the request has not been tampered with in transit. In some embodiments, the verification of step 540 may be performed by the communication channel used to transmit the request. For example, if the request was received over a secure communications protocol (e.g., SSL, or the like), the method 500 may verify that the request was not tampered with and/or modified in transit. Alternatively, or in addition, the request may include a signature or other data that may be used to verify the request. If the request is further authorized (e.g., verified to be free from modification or tampering), the flow may continue at step 550; otherwise, the flow may terminate at step 595.

At step 550, the request may be further authorized, which may comprise verifying that the first entity (the transferor) is the owner of the PEAC note(s) to be transferred. As discussed above, ownership may be determined by accessing ownership information of the PEAC note datastructures (e.g., by comparing an identifier of the first entity to the ownership information of the PEAC notes). If the first entity is the owner of the identified PEAC notes, the flow may continue to step 560; otherwise, the flow may terminate at step 595.

At step 560, the method 500 may transfer ownership of the PEAC note(s) to the second entity. Transferring ownership may comprise associating a UCNID of the PEAC notes with the UEID of the second entity (or alias thereof) in the corresponding PEAC note datastructures (e.g., datastructures 200 and/or 201). In addition, if the method 500 is configured to maintain a record of the ownership history of PEAC notes, the first entity (or alias thereof) may be added to a list of previous owners of the transferred PEAC note(s). As described above, the transfer of step 560 may include transfer to/from a transfer entity, which may involve adding and/or removing PEAC notes from electronic circulation.

At step 570, a record of the transaction may be recorded. The record may be made on a datastore (e.g., computer-readable storage medium) and/or on a tangible medium, such as a paper receipt. The record may be maintained by the method 500 and/or may be made available to the first entity and/or the second entity (e.g., via a user interface, by mail, by electronic message, or the like).

At step 580, the method 500 may transmit a confirmation message to the first entity and/or the second entity. The confirmation message may include the details of the transfer, such as the PEAC notes transferred, the date and/or time of the transfer, and the like. The confirmation message may be authenticated by the method 500 (e.g., using a digital signature or the like) to allow a recipient of the message to verify the authenticity or the message and/or to verify that the message has not been modified or tampered with.

At step 590, the method 500 may terminate.

At step 595, the method may terminate without performing the transfer. In some embodiments, step 595 may include the method 500 recording a record of the failed transaction. The record may specify the reason(s) the transaction was aborted (e.g., failure to authenticate the request, first entity not the owner of the currency, etc.). The record may be recorded on a computer-readable storage medium and/or on a tangible medium (e.g., a paper receipt). Alternatively, or in addition, the record may be transmitted to one or more of the parties to the aborted transaction (e.g., first entity, the second entity, of the like).

Figure 5B:
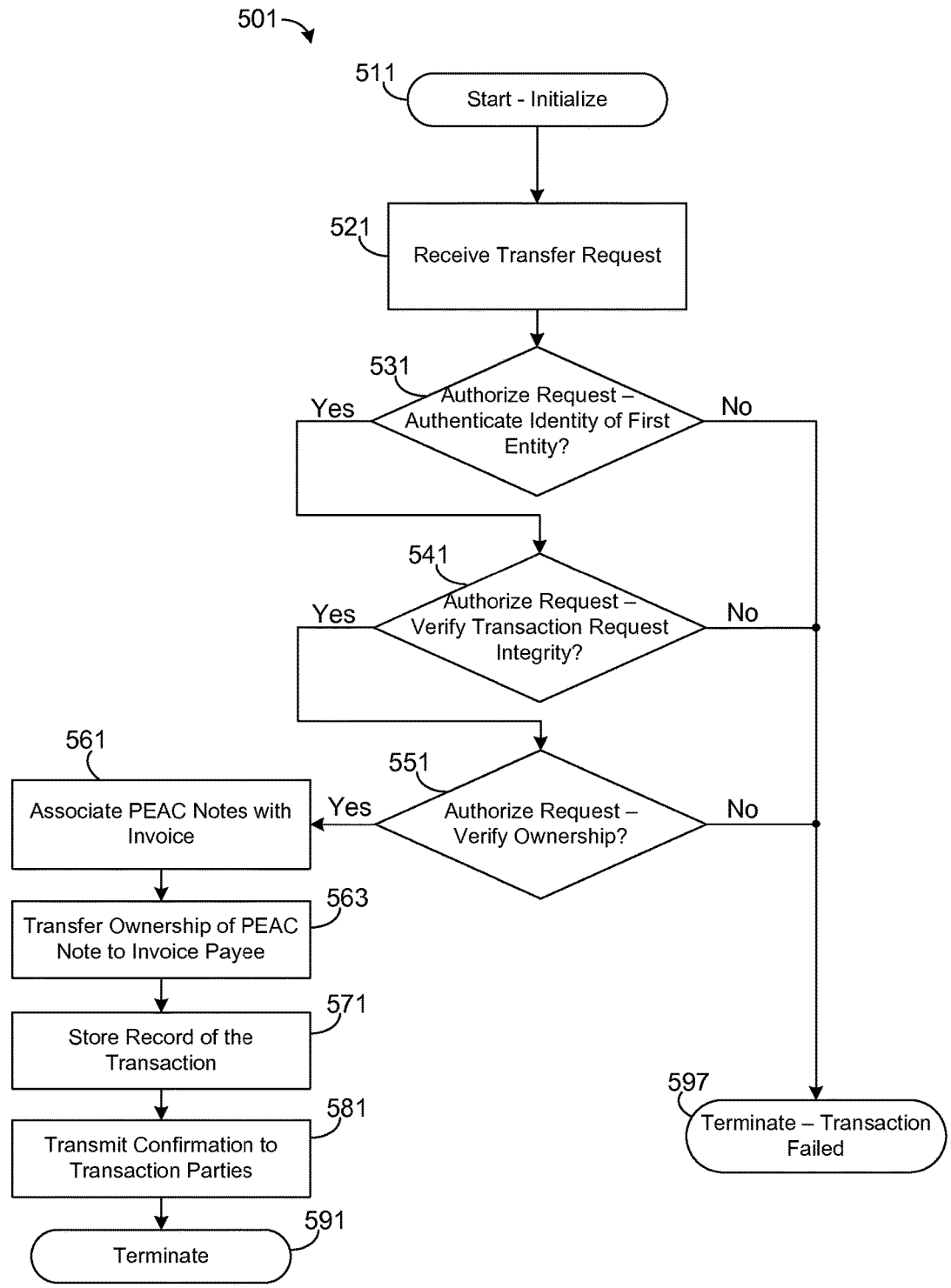
FIG. 5B is a flow diagram of another embodiment of a method for electronically circulating a currency.

FIG. 5B is a flow diagram of one embodiment of a method 501 for transferring PEAC notes to an entity using an invoice. At step 510, the method 501 may be initialized as described above.

At step 521, a request to transfer one or more PEAC note(s) from a first entity to an invoice may be received. The request may be transmitted by and/or authorized by a first entity, may identify the one or more PEAC notes to be transferred (e.g., by UCNID), and may identity an invoice to which the notes are to be transferred using a UIID and/or an alias thereof.

At steps 531, 541, and 551, transfer request may be authorized as described above. If any of the steps 531, 541, and/or 551 fail, the flow may terminate at step 597 as described above (which may comprise informing the requesting entity that the transaction could not be completed).

At step 561, the PEAC notes identified in the transaction request of step 521 may be associated with the identified invoice. The association of step 561 may comprise setting a payment field of an invoice data structure to the UCNIDs of the PEAC notes. The association may allow the invoice payer, invoice payee, and/or other entities, to view invoice payment details (e.g., verify that the invoice was paid, show which PEAC notes were used to pay the invoice, and so on).

At step 563, ownership of the PEAC notes associated with the invoice may be transferred to entity identified as the payee under the invoice (e.g., the UEID of an invoice payee field). The ownership transfer may take place as described above.

At steps 571, 581, and 591, a record of the transaction may be stored, confirmation may be transmitted, and the method 501 may terminate as described above. Step 571, may further comprise recording a record of the invoice, which may comprise storing the updated invoice (reflecting the transfer) on the datastore and/or producing a tangible record of the invoice.

Although the flow diagrams of FIGS. 4A-4B and 5A-5B describe a transaction to transfer ownership of electronically circulated PEAC note(s), the methods could be adapted to perform any other PEAC note-related task including, but not limited to: exchanging a first set of PEAC notes for a second set of PEAC notes (e.g., PEAC notes of another denomination, issued by another entity or state, and so on), viewing the ownership status of a PEAC note, viewing the ownership history of a PEAC note, viewing asset information (e.g., information regarding the currency reserve or asset custodian on a PEAC note), accessing audit information, purchasing PEAC notes, redeeming PEAC notes, and so on. Therefore, the flow diagrams of FIGS. 4A-4B and 5A-5B should not be read as limited to any particular set of PEAC functions.

Figure 6A:
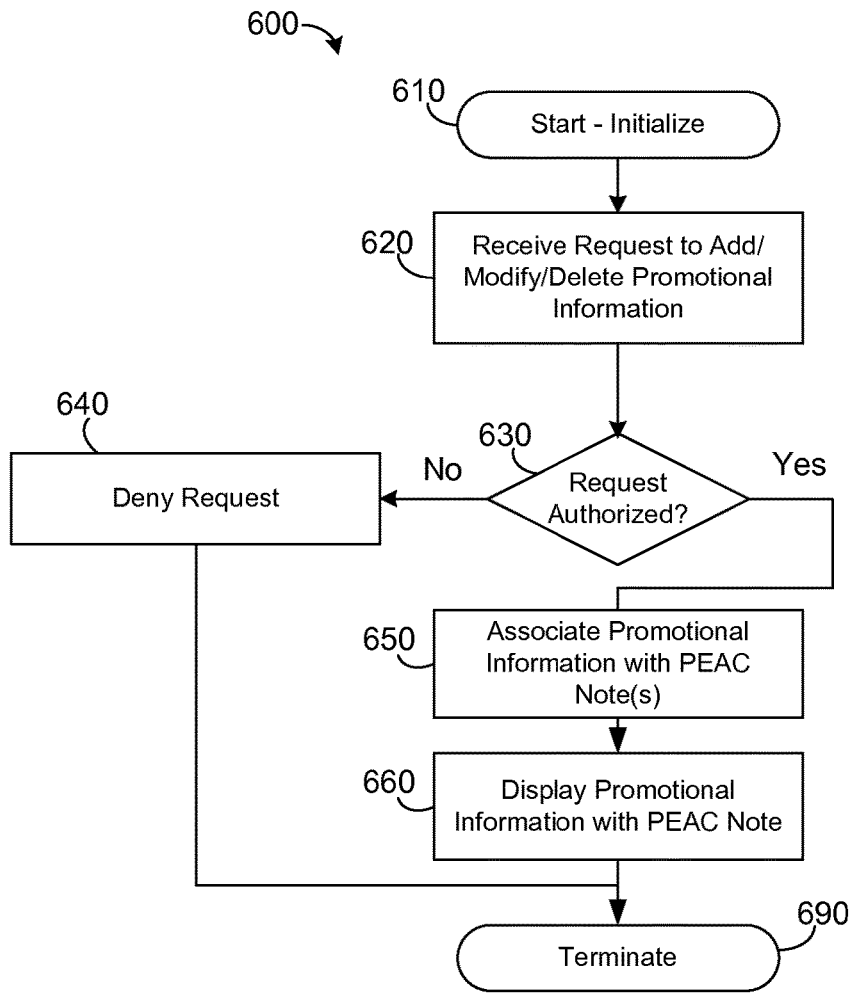
FIG. 6A is a flow diagram of one embodiment of a method for associating promotional information with a persistent, electronically anchored currency note.

FIG. 6A is a flow diagram of one embodiment of a method 600 for associating promotional information with a PEAC note. At step 610, the method 600 may be initialized as described above.

At step 620, a request to add, modify, and/or delete promotional information associated with one or more PEAC notes may be received. The request may include the promotional information to be associated with the PEAC notes (e.g., assets, such as images, video, audio, multimedia, links, or the like), may include edits to promotional information already associated with one or more notes, may include links to promotional information, or the like.

At step 630, the method 600 may determine whether the request is authorized. The determination may comprise authenticating the originator of the request (e.g., using an authentication authority, credential, or the like as described above). The determination may further include evaluating access control information associated with the promotional information and/or PEAC notes to be modified. As discussed above, access control information may specify which entities may add, delete, and/or modify which portions of promotional information associated with a PEAC note. If the request is not authorized, the flow may continue at step 640; otherwise, the flow may continue at step 650. Step 630 may comprise determining the current owner of the PEAC note, determining the custodian of the asset associated with the PEAC note, determining a "sponsor" of the PEAC note, and so on.

At step 640, the request may be denied, and the flow may terminate at step 690. Step 640 may further comprise returning a message to the requester indicating the reasons for the failure (e.g., failure to authenticate, denial of access, etc.).

At step 650, the promotional information may be associated with the PEAC note(s) specified at step 620. Accordingly, step 650 may comprise storing the promotional assets or other information provided at step 620 in a computer-readable storage medium and associating (e.g., linking) one or more PEAC note datastructures therewith. Step 620 may further comprise modifying and/or deleting promotional information already stored and/or associated with the identified PEAC note(s).

At step 660, the promotional information may be displayed in connection with the identified PEAC notes in an interface, such as the interface 304 of FIG. 3E. As discussed above, the promotional information may include any number of different asset types including, but not limited to: images, video, audio, links, multimedia, Flash™, text, and the like. The display of step 660 may be defined in the promotional information. For example, the promotional information provided and/or referenced at step 620 may include layout information specifying how the assets are to be displayed and/or presented in the interface. Alternatively, the interface itself and/or a user of the interface may determine how various promotional assets are to be presented.

In some embodiments, the display of various portions of the promotional information may depend on the entity to which the promotional information is being displayed. For example, a discount code may only be redeemable to the current owner of the PEAC note. Accordingly, the discount code may only be displayed to the current owner of the PEAC note. Display restrictions and/or preferences may be defined in the promotional information received at step 620.

Figure 6B:
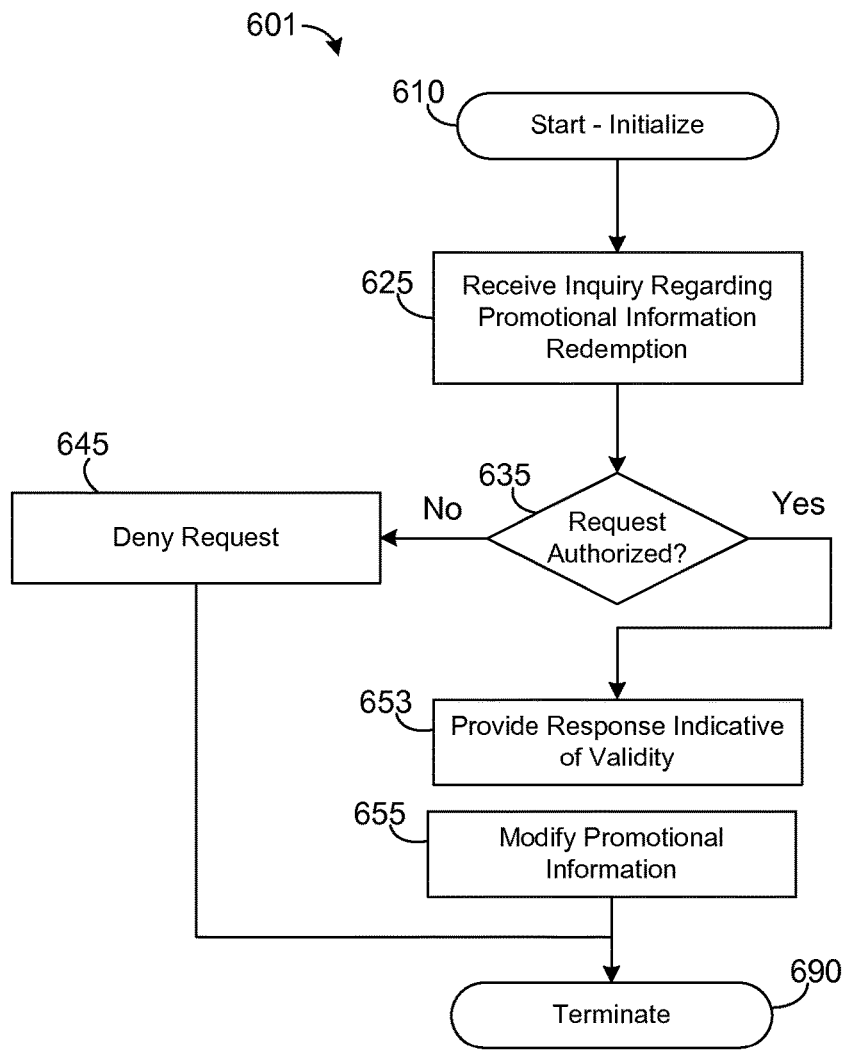
FIG. 6B is a flow diagram of one embodiment of a method for validating promotional information associated with a persistent, electronically anchored currency note.

FIG. 6B is a flow diagram of one embodiment of a method 601 for verifying and/or redeeming promotional information associated with a PEAC note. At step 610, the method 601 may start and be initialized as described above.

At step 625, an inquiry regarding promotional information may be received. The inquiry may be issued by an entity (e.g., storefront, Website, or the like), to which promotional information has been presented. For instance, when an owner of a PEAC note associated with a discount code presents the PEAC note and/or code to a storefront for redemption, the storefront may make a request to the method 601 to verify that the promotional information is valid, has not yet been redeemed, and/or that the entity presenting the PEAC note and/or code is authorized to do so (is the current owner of the PEAC note). Accordingly, the inquiry of step 625 may include the promotional information that is the subject of the inquiry (or an identifier thereof), an identifier of the entity who presented the promotional information (e.g., as a UEID or the like), an UCNID of the PEAC note associated with the promotional information, an identifier of the storefront to which the promotional information was presented, and so on.

At step 635, the method 601 may validate the promotional information, which may comprise: determining whether the entity who presented the promotional information is the owner of the identified PEAC note, verifying that the promotional information has not yet been redeemed, verifying that the promotional information is properly associated with the PEAC note, verifying that the promotional information has not been modified (e.g., corresponds to promotional information associated with the identified PEAC note), and so on. If the request is not authorized, the flow may continue to step 645; otherwise, the flow may continue at step 653.

At step 645, the request may be denied, which may comprise replying to the inquiry with an indication that the request cannot be authorized. The reply may indicate the reason the request was not authorized.

At step 653, the method 601 may provide a response indicating that the promotional information was successfully validated.

At step 655, the promotional information subject to the inquiry may be modified and/or updated to reflect the inquiry of step 625. If the promotional information was redeemed (e.g., if the promotional information was a one-time use coupon, or discount code), the promotional information may be removed from association with the PEAC note (or otherwise marked as "redeemed"). Alternatively, a counter associated with the promotional information may be updated (e.g., to reflect the number of accesses and/or uses thereof). In some embodiments, the inquiry of step 625 may specify how to modify the promotional information (e.g., may specify that the promotional information is to be modified, removed, transferred, or the like).

At step 690, the flow may terminate until another inquiry at step 625 is received.

The systems and methods disclosed herein may be used to implement various different types of payment transactions. In some embodiments, PEAC notes may be used to implement secure, gift-card type transactions. A "gift card" or "conditional" PEAC note refers to a PEAC note that is subject to one or more usage conditions. For example, a conditional PEAC note may be redeemable only at a particular business entity (e.g., a PEAC note may be restricted to use at a particular business).

Payment for a traditional gift card is typically transferred to an "issuer," which then becomes obligated to accept the gift card as payment for goods and/or services provided thereby. Accordingly, the value of a gift card may be (or may appear to be) dependent upon the viability of the issuer. If the issuer becomes insolvent (e.g., declares bankruptcy), or is otherwise unable to satisfy the gift card owner's needs, the value of the gift card may be obviated. Therefore, customers may be wary of purchasing gift cards, particularly from smaller, lesser known issuers.

In some embodiments, a "gift card" or "conditional" PEAC note is provided. As used herein, a conditional PEAC note refers to a PEAC note that is subject to one or more usage conditions. The usage conditions may include, but are not limited to: limiting the PEAC note to use at particular entity, limiting the PEAC note to particular types of transfers, limiting the PEAC note to particular types of purchases, and so on. A usage condition may be used to modify the appearance of a PEAC note. For example, when displayed in an interface, such as interface of FIG. 3E, the conditional PEAC note may comprise branding or promotional information of the entity at which the gift card PEAC note may be redeemed.

A conditional PEAC note may further comprise one or more release conditions. As used herein, a release condition refers to a condition that, when met, releases one or more of usage conditions. In some embodiments, a release condition may cause a conditional PEAC note to revert to a standard (unconditional) PEAC note. A release condition may include, but is not limited to: a timing constraint (e.g., the usage conditions may expire after a pre-determined time); a solvency constraint (e.g., usage conditions may be lifted if the issuer becomes insolvent); and so on. In some embodiments, usage conditions may be automatically removed upon satisfying one or more release conditions. For example, usage conditions may be removed when a conditional PEAC note is transferred to a qualifying entity (e.g., the issuer or storefront associated with the conditional PEAC note).

A transaction provider may evaluate release conditions to determine whether one or more usage conditions of a conditional PEAC note should be removed. The assurance that usage conditions can be removed under appropriate circumstances may provide added confidence in the purchase of conditional PEAC notes, since the chance of the conditional PEAC notes losing their value is significantly reduced. Moreover, since the underling value of a conditional PEAC note remains with the owner (and is tied to the underlying asset), the chance of loss due to the issuer becoming insolvent is obviated.

Figure 7:
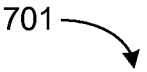
FIG. 7 depicts another embodiment of a PEAC note datastructure.

In some embodiments, a data structure representing a PEAC note may be extended to include and/or reference one or more usage conditions and/or release conditions. FIG. 7 depicts one example of a PEAC note data structure 701 that includes a usage conditions field 762, which may comprise and/or reference usage conditions of a PEAC note. The data structure 701 may further include a release conditions field 764, which may comprise and/or reference release conditions of the PEAC note.

In some embodiments, an issuer may create a conditional PEAC note by acquiring ownership of a PEAC note and imposing one or more use conditions and/or release conditions on the PEAC note (resulting in a conditional PEAC note). The issuer may transfer ownership of the conditional PEAC note to another entity. The conditional PEAC note may retain the use and/or release conditions when ownership is transferred. The conditions may remain on the conditional PEAC note until ownership returns to the issuer and/or one or more of the release conditions are met.

Referring to FIG. 1, a storefront 136 that owns a PEAC note 125 may use the transaction provider 120 to convert the PEAC note 125 into a conditional PEAC note. The storefront 138 may issue a request to the transaction provider 120 to convert the PEAC note 125 via the network. The request may specify the usage and/or release conditions to be applied to the PEAC note 125. Alternatively, or in addition, the storefront 136 may maintain pre-determined usage and/or release conditions within the datastore 124 of the transaction provider 120. In response to the request, the transaction provider 120 applies one or more usage and/or release conditions on the PEAC note 125.

In some embodiments, the first entity 132 may purchase a conditional PEAC note from the storefront 136 by exchanging one or more PEAC notes owned by the first entity 132 for one or more conditional PEAC notes of the storefront 136.

Alternatively, or in addition, the first entity 132 may convert an "unconditional" PEAC note 125 into a conditional PEAC note 125 associated with an issuer, such as the storefront 136. The conversion may comprise the transaction provider 120 applying one or more usage and/or release conditions on the PEAC note 125, as described above. In some embodiments, the storefront 136 may provide incentives for "purchasing" (e.g., converting) conditional PEAC notes. Such incentives may include, but are not limited to: rebates, discounts, or the like. Ownership of a conditional PEAC note 125 may remain with the first entity 132. The first entity 132 may be allowed to transfer ownership of the conditional PEAC note to a second entity 134.

In some embodiments, ownership of a conditional PEAC note 125 (or other type of PEAC note) may be transferred to a "placeholder" owner 129. As used herein, a placeholder owner refers to an entity that holds ownership of one or more PEAC notes until the PEAC notes are transferred to an intended recipient. Accordingly, a placeholder owner may perform an "escrow" function. A placeholder owner may be associated with a credential, such as a redemption code, PIN, or the like. The transaction provider 120 may be configured to transfer ownership of PEAC notes held by a placeholder owner when presented with the credential. For example, a placeholder owner 129 may hold ownership of a conditional PEAC note 125, and the credential of the placeholder owner 129 may be printed on a physical card (not shown). An entity 134 may receive the physical card, and provide the credential to the transaction provider 120 via the network 140. The transaction provider 120 may validate the credential and transfer ownership of the conditional PEAC note 125 to the entity 134.

As discussed above, a conditional PEAC note may be subject to usage restrictions. Accordingly, the transaction provider 120 may evaluate the usage conditions when ownership of the conditional PEAC note is transferred. In some embodiments, the transaction provider 120 may prevent a conditional PEAC note from being transferred if the transfer would violate one of more of the usage conditions.

Figure 8:
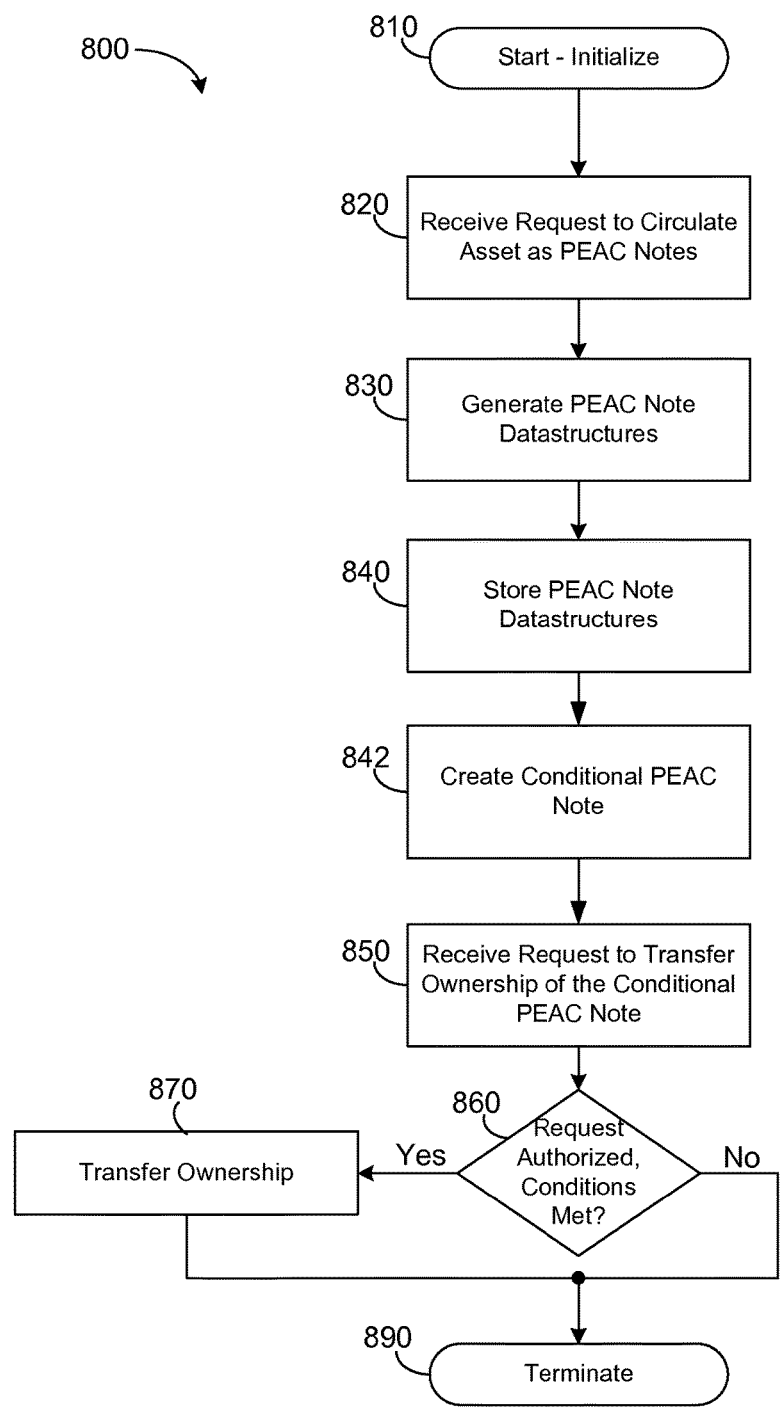
FIG. 8 is a flow diagram of one embodiment of a method for circulating a conditional PEAC note.

FIG. 8 is a flow diagram of one embodiment of a method for circulating a PEAC note, which is subject to one or more usage conditions (e.g., a conditional PEAC note). At steps 810, 820, 830, and 840, the method 800 starts, is initialized, establishes a PEAC note asset, generates PEAC note datastructures, and stores the PEAC note datastructures in a non-transitory computer-readable storage medium, as described above.

Step 842 may comprise converting the PEAC note into a conditional PEAC note, which may include applying one or more usage and/or release conditions to a PEAC note, as described above. The usage and/or release conditions may be included in the PEAC note datastructure on the computer-readable storage medium. In some embodiments, step 842 may comprise transferring the conditional PEAC note to a new owner, such as a placeholder owner, or the like, as described above.

In some embodiments, step 842 comprises a storefront (or other entity) generating a request to create a conditional PEAC note. The request may specify usage and/or release constraints for the conditional PEAC note, as described above. Alternatively, or in addition, the storefront may reference one or more pre-established usage and/or release constraints to be applied to the PEAC note. In response to the request, a transaction provider (such as the transaction provider 120 described above) may authorize the request (e.g., verify that the storefront owns the PEAC note) and convert the PEAC note into a conditional PEAC note, as described above. The storefront may then transfer ownership of the conditional PEAC note to another entity (e.g., a purchaser), as described above. An entity, such as the first entity 132, may purchase the conditional PEAC note from the storefront. In another example, an entity may convert a PEAC note, which it owns into a conditional PEAC note associated with a particular issuer (e.g., storefront 136), as described above.

At step 850, a request to transfer ownership of the conditional PEAC note is received. The request may identify the transferor and intended transferee of the conditional PEAC note, as described above. The request may further comprise a credential to authenticate the identity of the transferor (and/or authenticate the request), as described above.

Step 860 may comprise determining whether the request is authorized, as described above. Step 860 may further comprise evaluating one or more usage conditions on the conditional PEAC note. The usage conditions may restrict the entities to which the PEAC note may be transferred (e.g., may only be used at a particular storefront, etc.). The usage conditions may, however, allow one or more "person-to-person" transfers. Accordingly, step 860 may comprise evaluating the usage conditions in accordance with the intended transferee. Other usage conditions may relate to product or service constraints (e.g., determine the type of product or service that may be purchased with the conditional PEAC note), and so on. Accordingly, step 860 may comprise evaluating other aspects of the transfer request, such as an invoice, receipt, or the like.

Step 860 may further comprise evaluating one or more release conditions of the conditional PEAC note. As described above, release conditions may define conditions under which one or more of the usage conditions on a conditional PEAC node are removed. Removing a usage condition may allow the conditional PEAC note to be transferred even if the transfer would violate the removed usage condition. The removed usage condition may be deleted from the conditional PEAC note datastructure.

In some embodiments, a conditional PEAC note may be associated with promotional materials, such as a discount, special offer, or the like. Accordingly, step 860 may comprise validating and/or applying one or more promotions as described above.

If step 860 indicates that the request is authorized and the usage conditions are met, the flow may continue to step 870, where ownership is transferred as described above. At step 890 the flow terminates until a next transfer request is received.

Figure 9:
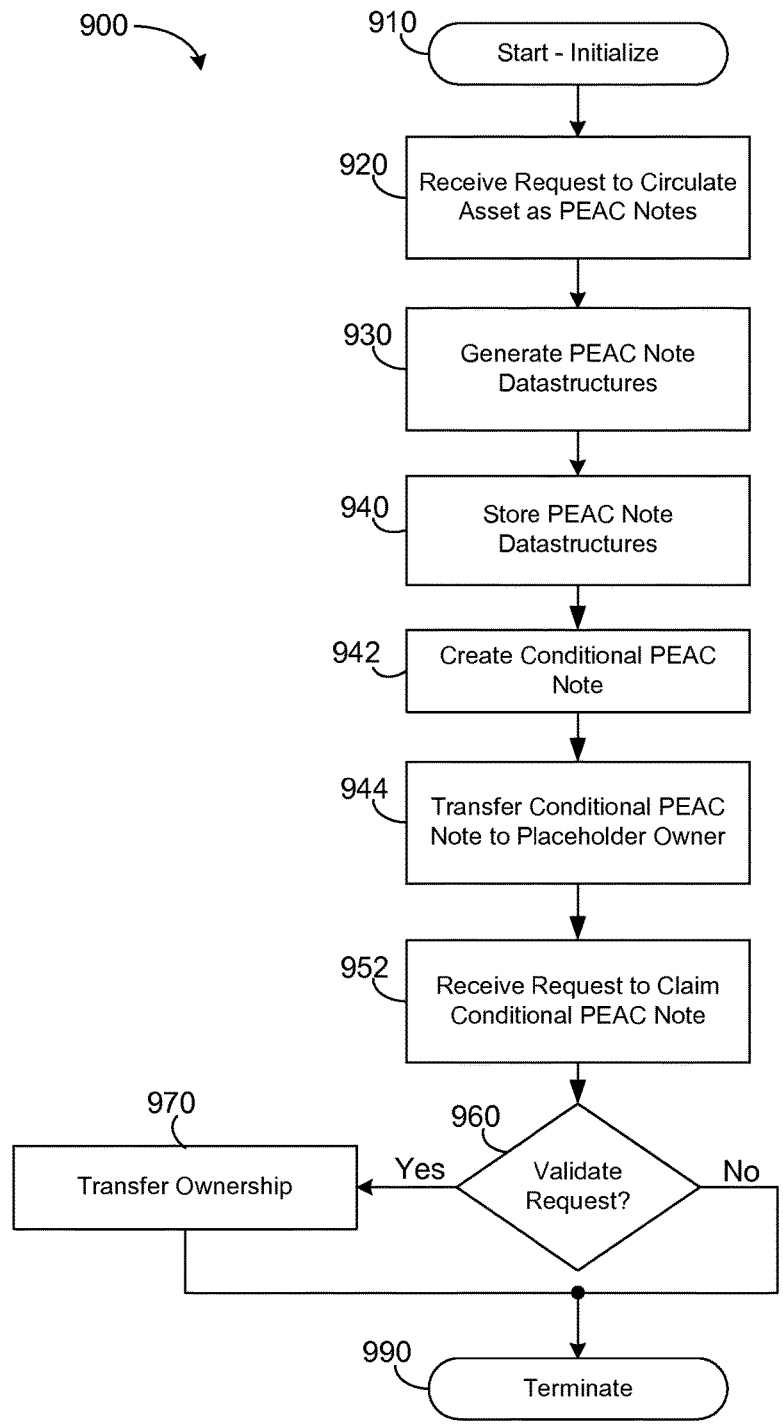
FIG. 9 is a flow diagram of another embodiment of a method for circulating a conditional PEAC note.

FIG. 9 is a flow diagram of one embodiment of a method 900 for circulating a conditional PEAC note.

At steps 910, 920, 930, 940, and 942, the method 900 starts, is initialized, establishes a PEAC note asset, generates PEAC note datastructures, stores the PEAC note datastructures in a non-transitory computer-readable storage medium, and creates a conditional PEAC note, as described above.

Step 944 may comprise transferring ownership of the conditional PEAC to a placeholder owner, as described above. Step 944 may comprise establishing a credential that may be used to transfer ownership of the conditional PEAC note. The credential may comprise a human-readable code, password, PIN, or the like. The credential may be encoded on a physical media, such as a card, paper slip, receipt, gift box, or the like.

Step 952 comprises receiving a request to claim the conditional PEAC note. The request may be received at a transaction provider over a network. The request may identify the conditional PEAC note and/or the credential of step 944. The request may identify the entity to which the conditional PEAC note is to be transferred. Alternatively, or in addition, the request may establish a new entity account with the transaction provider.

At step 960, the request is validated, which may comprise authenticating the entity associated with the request, validating the credential of the request, verifying ownership of the conditional PEAC note (e.g., verifying that the conditional PEAC note has not already been claimed), and so on. If the request is validated, the flow may continue to step 970; otherwise, the flow terminates at step 990. Step 960 may comprise evaluating one or more usage conditions associated with the PEAC note, to verify that the transfer can take place, as described above. Step 960 may further comprise evaluating release conditions to determine whether one or more of the usage conditions should be removed, as described above.

Step 970 may comprise transferring ownership of the conditional PEAC note from the placeholder entity to the entity specified in the request. Step 970 may further comprise removing the placeholder entity from a datastore (if the placeholder no longer owns any PEAC notes). Step 970 may further comprise maintaining usage and/or release conditions associated with the conditional PEAC note. Step 970 may further comprise evaluating release conditions of the conditional PEAC note to determine whether any of the usage conditions should be removed, as described above.

Figure 10:
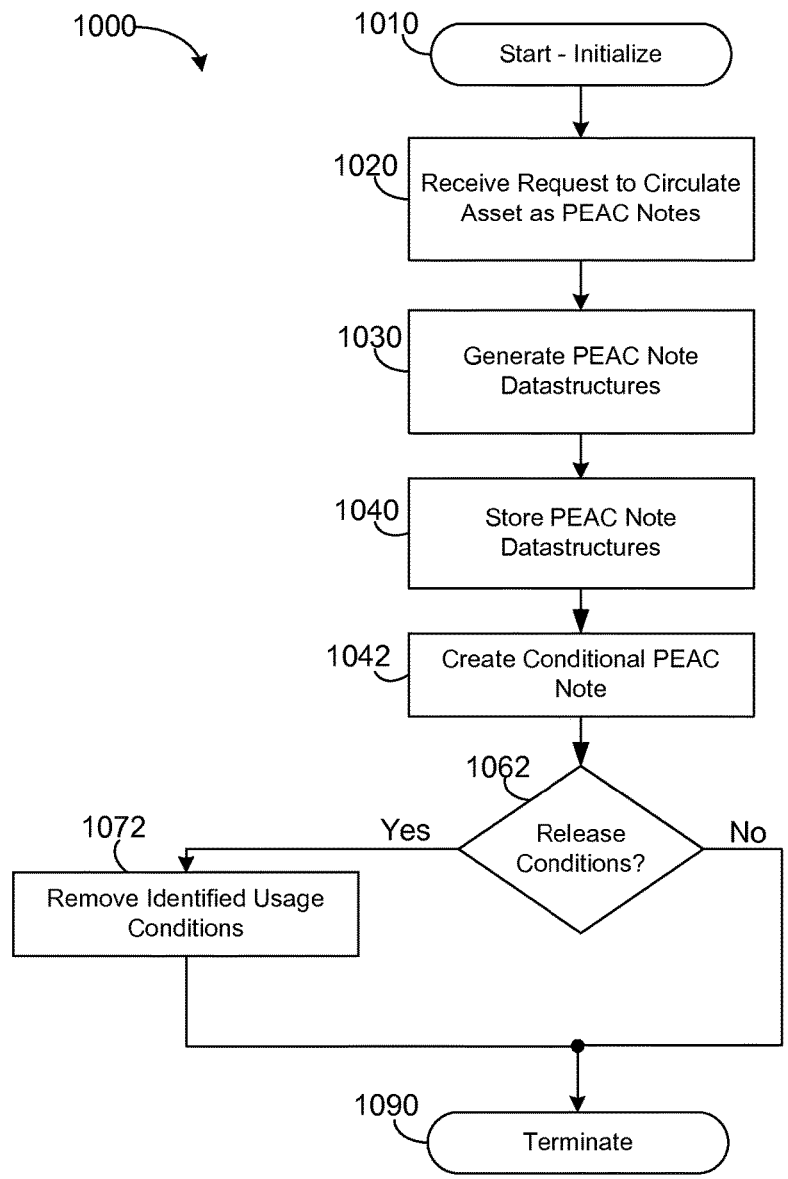
FIG. 10 is a flow diagram of one embodiment of a method for removing a usage constraint from a conditional PEAC note.

FIG. 10 is a flow diagram of one embodiment of a method 1000 for circulating a conditional PEAC note.

At steps 1010, 1020, 1030, 1040, and 1042, the method 1000 starts, is initialized, establishes a PEAC note asset, generates PEAC note datastructures, stores the PEAC note datastructures in a non-transitory computer-readable storage medium, and creates a conditional PEAC note, as described above.

Step 1062 comprises evaluating one or more release conditions of the conditional PEAC note. Step 1062 may comprise determining that one or more usage conditions of the conditional PEAC note should be removed. Accordingly, step 1062 may comprise converting a conditional PEAC note into an "unconditional" PEAC note.

Step 1062 may be initiated in response to a transaction involving the conditional PEAC note, a periodic audit of usage conditions (e.g., the transaction provider, or other entity, may be configured to periodically audit the usage conditions of conditional PEAC notes), or a request from the owner of the conditional PEAC note. Step 1062 may be used to release a conditional PEAC note from one or more usage conditions that cannot be satisfied. For example, usage condition that a conditional PEAC note be used at particular storefront may be released if the storefront becomes insolvent. In another example, a usage condition may be removed in response to the storefront changing its prices or policies, the expiration of a time limit, or the like, as described above. If evaluation of step 1062 determines that one or more usage conditions should be removed, the flow continues to step 1072; otherwise, the flow terminates at step 1090.

Step 1072 comprises removing the usage constraints identified at step 1062 from the conditional PEAC note. Subsequent transfers of the PEAC note may not be subject to the usage conditions removed at step 1072. Step 1072 may comprise updating a PEAC note datastructure in a non-transitory computer-readable storage medium. Step 1072 may comprise converting the conditional PEAC note into a standard "unconditional" PEAC note, as described above.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

What is claimed is:

1. An apparatus, comprising:
 a computing device comprising a processor, a communication interface to an electronic communication network, and a non-transitory computer-readable storage medium comprising a database;
 a transaction provider operating on the processor of the computing device, wherein the transaction provider is configured to define persistent, electronically anchored currency note (PEAC note) records in the database, each PEAC note record being assigned a unique uniform resource identifier that resolves to electronic content within the electronic communication network,
 wherein the transaction provider is configured to associate the PEAC note records with respective assets held by a custodian such that each of the PEAC note record corresponds to a monetary value,
 wherein the transaction provider is configured to assign ownership of PEAC note records to respective owners by associating unique identifiers of the PEAC note records with respective owner identifiers, including assigning ownership of a first PEAC note record having a particular unique uniform resource identifier to a first entity,
 and wherein the transaction provider is configured to implement secure, real-time transfers of ownership of the PEAC note records through the electronic communication network while maintaining the PEAC note records within the database and maintaining the assets corresponding to the PEAC note records with the custodians, wherein transferring ownership of the first PEAC note record to a second entity comprises,
  receiving a transfer request to transfer ownership of the first PEAC note through the communication interface to the electronic communication network,
  authorizing the transfer request based on a credential of the first entity,
  transferring ownership of the first PEAC note to the second entity in response to authorizing the transfer request, wherein ownership is transferred while maintaining the asset associated with the first PEAC note record with the custodian, and wherein ownership of the first PEAC note record is transferrable by the second entity and retains the particular unique uniform resource identifier in the database, and transmitting electronic data to the second entity through the communication interface to the electronic communication network to verify that ownership of the first PEAC note record is transferred to the second entity;

wherein the transaction provider is further configured to provide electronic content pertaining to PEAC note records within the electronic communication network, wherein providing electronic content pertaining to the first PEAC note comprises, registering the particular unique uniform resource identifier of the first PEAC note record to a domain of the transaction provider within the electronic communication network, receiving an information request through the electronic communication network, the information request directed to the particular unique uniform resource identifier of the first PEAC note, generating electronic content comprising information pertaining to the first PEAC note that identifies the custodian of the asset corresponding with the first PEAC note, and transmitting the generated electronic content through the communication interface to the electronic communication network.

2. The apparatus of claim 1, wherein the transaction provider is configured to determine whether a requested transfer of the first PEAC note record satisfies the usage condition, and prevents the first PEAC note record from being transferred when the usage condition is not satisfied.

3. The apparatus of claim 1, wherein the usage condition identifies an entity to which the PEAC note record can be transferred, and wherein the usage condition is satisfied when the second entity corresponds to the entity identified in the usage condition.

4. The apparatus of claim 1, wherein the usage condition comprises a release condition, and wherein the transaction provider is configured to remove the usage condition from the first PEAC note record in response to determining that the release condition is satisfied.

5. The apparatus of claim 4, wherein the release condition is satisfied after a pre-determined time.

6. The apparatus of claim 4, wherein the release condition is satisfied in response to an entity identified in the release condition becoming insolvent.

7. The apparatus of claim 4, wherein the release condition is satisfied in response to transferring ownership of the first PEAC note record to an entity identified in the release condition.

8. The apparatus of claim 1, wherein the transaction provider is configured to remove the usage condition from the first PEAC note record in response to transferring ownership of the first PEAC note record to the second entity.

9. The apparatus of claim 1, wherein the transaction provider is configured to apply the usage condition to the first PEAC note record in response to a request from an owner of the first PEAC note record.

10. The apparatus of claim 1, wherein the transaction provider transfers ownership of the first PEAC note record to a placeholder owner and associates the placeholder owner with a redemption credential, and wherein the transaction provider transfers ownership of the first PEAC note record to the first entity in response to the first entity presenting the redemption credential.

11. A non-transitory computer-readable storage medium comprising instructions to cause a computing device to perform operations, the operations comprising:

maintaining a plurality of persistent, electronically anchored currency notes (PEAC notes) within a data store of a computing system, each PEAC note comprising a respective unique uniform resource identifier, having an assigned value, and being associated with an asset held by a custodian;

providing electronic content pertaining to respective PEAC notes via the electronic communication network in response to requests comprising unique uniform resource identifiers of the respective PEAC notes;

implementing a secure, real-time transfer of ownership of a first PEAC note through the electronic communication network while retaining the first PEAC note within the data store and maintaining the asset with the custodian, the first PEAC note having a first unique uniform resource identifier that resolves to first electronic content pertaining to the first PEAC note within the electronic communication network, wherein the secure, real-time transfer is implemented in response to receiving a request to transfer ownership of the first PEAC note from a first entity to a second entity, and comprises:

transferring ownership of the first PEAC note to the second entity in response to validating that the first PEAC note is owned by the first entity, and transmitting electronic data to the second entity through the electronic communication network to confirm that ownership of the first PEAC note record is transferred to the second entity, wherein the first PEAC note is transferrable by the second entity and retains the first unique uniform resource identifier in the database, the operations further comprising:

providing electronic content associated with the first PEAC note via the electronic communication network in response a request comprising the first unique uniform resource identifier subsequent ownership of the first PEAC note to the second entity being transferred to the second entity.

12. The non-transitory computer-readable medium of claim 11, the operations further comprising assigning a usage condition to the first PEAC note that must be satisfied in order to transfer ownership of the first PEAC note from the first entity, wherein implementing the secure, real-time transfer of ownership of the first PEAC note further comprises verifying that the transfer satisfies the usage condition assigned to the first PEAC note.

13. The non-transitory computer-readable medium of claim 12, wherein the usage condition identifies an entity to which the PEAC note can be transferred, and wherein the usage condition is satisfied when the second entity corresponds to the entity to which the first PEAC note can be transferred.

14. The non-transitory computer-readable medium of claim 12, wherein transferring ownership of the first PEAC note to the second entity further comprises removing the usage condition from the first PEAC note in the data store.

15. The non-transitory computer-readable medium of claim 11, the operations further comprising:

associating a transfer restriction with the first PEAC note, the transfer restriction having a release condition that must be satisfied for ownership of the first PEAC note to be transferred from the first PEAC note; and removing the transfer restriction from the first PEAC note in response to determining that the release condition is satisfied, wherein the release condition comprises one or more of expiration of a pre-determined time, a request to transfer ownership to a designated entity, completion of an ownership transfer, and insolvency of the designated entity.

16. The non-transitory computer-readable medium of claim 11, the operations further comprising:

transferring ownership of the first PEAC note to a placeholder owner;

associating the first PEAC note with a redemption credential; and transferring ownership of the first PEAC note to the first entity in response to verifying that the first entity possesses the redemption credential associated with the first PEAC note.

17. A computer-implemented method, comprising:

maintaining by a processor of a server computing device, a plurality of persistent, electronically anchored currency notes (PEAC notes) in a datastore, each PEAC note comprising a respective unique uniform resource identifier, having a value, and being associated with an asset held by a custodian;

providing electronic content pertaining to the PEAC notes via an electronic communication network in response to requests comprising the respective unique uniform resource identifiers of the PEAC notes;

implementing a secure, real-time transfer of ownership of a first PEAC note from a first entity to a second entity in response to a first transfer request, wherein implementing the secure, real-time transfer of ownership comprises:

using the processor of the server computing device to verify that the first transfer request is authorized by confirming that the data store indicates that the first entity possesses ownership of the first PEAC note, and using the processor of the server computing device to transfer ownership of the first PEAC note to the second entity, wherein transferring ownership of the first PEAC note comprises recording that the second entity possesses ownership of the first PEAC note in the datastore and transmitting electronic data verifying that the second entity possesses ownership of the first PEAC note via the electronic communication network, wherein ownership of the first PEAC note is transferred to the second entity while retaining the first PEAC note in the datastore with the first unique uniform resource identifier and maintaining the asset associated with the first PEAC note with the custodian, and wherein the first PEAC note is transferrable by the second entity; and providing electronic content pertaining to the first PEAC note via the electronic communication network in response to a request received while the second entity possesses ownership of the first PEAC note and comprising the first unique uniform resource identifier.

18. The method of claim 17, further comprising applying a usage condition to the first PEAC note maintained in the data store that must be satisfied by ownership transfer requests pertaining to the first PEAC note, wherein implementing the secure, real-time transfer further comprises determining that the first transfer request satisfies the usage condition.

19. The method of claim 18, wherein the usage condition identifies an entity to which the first PEAC note can be transferred, and wherein determining that the first transfer request satisfies the usage condition comprises determining that the second entity corresponds to the identified entity.

20. The method of claim 17, further comprising:

applying a usage to the first PEAC note maintained in the data store that must be satisfied by ownership transfer requests pertaining to the first PEAC note; and removing the usage condition from the first PEAC note maintained in the data store in response to satisfying a release condition of the usage condition.

21. The method of claim 20, wherein the release condition comprises one of expiration of a pre-determined time, completion of an ownership transfer, and insolvency of a pre-determined entity.

22. The method of claim 17, further comprising:

transferring ownership of the first PEAC note to a placeholder owner;

associating the first PEAC note with a redemption credential; and transferring ownership of the first PEAC note to the first entity in response to verifying that the first entity possesses the credential associated with the first PEAC note.

* * * * *